United States Patent
Kato et al.

(10) Patent No.: US 9,014,267 B2
(45) Date of Patent: Apr. 21, 2015

(54) SYSTEM AND METHOD FOR ENCODING AND DECODING WITH DYNAMIC INTERPOLATION FILTER

(75) Inventors: Sadaatsu Kato, Yokosuka (JP); Choong Seng Boon, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1091 days.

(21) Appl. No.: 12/475,087

(22) Filed: May 29, 2009

(65) Prior Publication Data

US 2009/0274216 A1 Nov. 5, 2009

Related U.S. Application Data

(63) Continuation of application No. PCT/JP2007/072951, filed on Nov. 28, 2007.

(30) Foreign Application Priority Data

Nov. 30, 2006 (JP) .................. P2006-324925

(51) Int. Cl.
*H04N 7/12* (2006.01)
*H04N 19/523* (2014.01)
*H04N 19/147* (2014.01)
*H04N 19/117* (2014.01)
*H04N 19/80* (2014.01)
*H04N 19/53* (2014.01)
*H04N 19/533* (2014.01)

(52) U.S. Cl.
CPC .......... *H04N 19/523* (2014.11); *H04N 19/147* (2014.11); *H04N 19/117* (2014.11); *H04N 19/80* (2014.11); *H04N 19/53* (2014.11); *H04N 19/533* (2014.11)

(58) Field of Classification Search
CPC .................................... H04N 19/523
USPC ................................... 375/240.16
See application file for complete search history.

(56) References Cited

U.S. PATENT DOCUMENTS

| 7,750,897 | B2 * | 7/2010 | Nishi et al. ............. 345/204 |
| 7,903,733 | B2 * | 3/2011 | Panda et al. ............. 375/240.03 |
| 2004/0062307 | A1 * | 4/2004 | Hallapuro et al. ....... 375/240.13 |
| 2004/0076333 | A1 * | 4/2004 | Zhang et al. ............ 382/238 |
| 2004/0161035 | A1 * | 8/2004 | Wedi .................... 375/240.12 |

(Continued)

FOREIGN PATENT DOCUMENTS

| EP | 1432249 A1 | 6/2004 |
| JP | 06-038197 | 2/1994 |

(Continued)

OTHER PUBLICATIONS

Office Action from counterpart Russian Application No. 2009124928/09 dated Feb. 5, 2010, 7 pages (with English translation).

(Continued)

*Primary Examiner* — Richard Torrente
(74) *Attorney, Agent, or Firm* — Brinks Gilson & Lione

(57) ABSTRACT

The present invention compensates motion at high precision even for an image having different characteristics in the horizontal direction and vertical direction, while decreasing code quantity of filter coefficients when a reference image with the fractional image accuracy is generated using a filter of each frame and is encoded and decoded with compensating motion.

50 Claims, 16 Drawing Sheets

(56) References Cited

U.S. PATENT DOCUMENTS

2004/0247190 A1* 12/2004 Hagai et al. .................. 382/238
2006/0294171 A1* 12/2006 Bossen et al. ................ 708/300

FOREIGN PATENT DOCUMENTS

| JP | 2004-147328 | 5/2004 |
|---|---|---|
| JP | 2004-165785 | 6/2004 |
| JP | 2005-501442 | 1/2005 |
| KR | 557911 B1 | 3/2006 |
| WO | WO 03/058945 A2 | 7/2003 |

OTHER PUBLICATIONS

Office Action from counterpart Australian Application No. 2007330109, dated Apr. 30, 2010, 2 pages.
International Search Report for International Application No. PCT/JP2007/072951, dated Mar. 11, 2008, 1 page.
International Preliminary Report on Patentability for International Application No. PCT/JP2007/072951, dated Jun. 3, 2009, 4 pages.
International Telecommunication Union, ITU-T, Telecommunication Standardization Sector of ITU, Series H: Audiovisual and Multimedia Systems, Infrastructure of Audiovisual Services—Coding of Moving Video: Advanced Video Coding for Generic Audiovisual Services, H.264, Mar. 2005, 341 pages.
Vatis, Y., "Motion-and Aliasing-Compensated Prediction Using a Two-Dimensional Non-Separable Adaptive Wiener Interpolation Filter", Proc. ICIP 2005, IEEE International Conference on Image Processing, Genova, Italy, Sep. 2005, 4 pages.
Wedi, Thomas, "Adaptive Interpolation Filter for Motion Compensated Hybrid Video Coding", Proc. Picture Coding Symposium (PCS 2001), Seoul, Korea, Apr. 2001, 4 pages.
Office Action from Australian Application No. 2012200473, dated Aug. 24, 2012, 3 pages.
Office Action from Canadian Application No. 2,671,180, dated Sep. 27, 2012, 4 pages.

* cited by examiner

SYSTEM AND METHOD FOR ENCODING AND DECODING WITH DYNAMIC INTERPOLATION FILTER

This application is a continuation of PCT/JP2007/072951 filed Nov. 28, 2007, which claims priority to JP2006-324925 filed Nov. 30, 2006, the entire content of which is incorporated herein by reference.

TECHNICAL FIELD

The present invention relates to a video encoding device, video encoding method, video encoding program, video decoding device, video decoding method and video decoding program.

BACKGROUND ART

In a video encoding system using motion compensation, motion of the encoding target image is detected using a reference image which has already been encoded in the past and stored in a frame memory, and a motion compensated image (predicted image) is created from the reference image, using the detected motion vector. In this case, accuracy of the reference image is changed from an accuracy in pixel units that originally existed in the reference image (integral pixel accuracy) to an accuracy in pixel units located between adjacent pixels in the reference image (fractional pixel accuracy), so that the motion of the encoding target image can be compensated at high accuracy, and the encoding efficiency can be improved.

In the case of the H.264 encoding system, cited in International Telecommunication Union, "Advanced Video Coding for Generic Audio Visual Services", high encoding efficiency is implemented by performing motion detection and motion compensation using a reference image at ¼ pixel accuracy.

Specifically, a reference image with a ½ pixel accuracy is generated by using a 6-tap filter with coefficients of (1, −5, 20, 20, −5, 1)/32 for a reference image with an integral pixel accuracy. Then a reference image with a ¼ pixel accuracy is generated by using a 2-tap averaging filter with a coefficients (1, 1)/2 for a reference image with ½ pixel accuracy.

A method for generating a reference image with a ¼ pixel accuracy according to the H.264 encoding system will be described in detail with reference to FIG. 1. FIG. 1 is a diagram depicting an arrangement of pixels in a reference image with ¼ pixel accuracy. A ½ pixel signal in a mid-position of two integral pixel signals in the horizontal direction is generated by a 6-tap filter in the horizontal direction. For example, pixel b is calculated as the following Expression (1), by using the 6-tap filter in the horizontal direction for integral pixels E, F, G, H, I and J.

$$b=(E-5F+20G+20H-5I+J)/32 \quad (1)$$

A ½ pixel signal in a mid-position of two integral pixel signals in the vertical direction is generated by a 6-tap filter in the vertical direction. For example, the pixel h is calculated as the following Expression (2) by using the 6-tap filter in the vertical direction for integral pixels A, C, G, M, R and T.

$$h=(A-5C+20G+20M-5R+T)/32 \quad (2)$$

A ½ pixel signal in a mid-position of four integral pixel signals is generated by using a 6-tap filter in both the horizontal and vertical directions. For example, a pixel j is calculated as the following Expression (3) by generating ½ pixel signals aa, bb, b, s, gg and hh using the 6-tap filter in the horizontal direction, and then using the 6-tap filter in the vertical direction for these signals.

$$j=(aa-5bb+20b+20s-5gg+hh)/32 \quad (3)$$

Or pixel j may be generated as the following Expression (4) by generating ½ pixel signals cc, dd, h, m, ee and ff by vertical filtering, and then performing horizontal filtering [for these signals].

$$j=(cc-5dd+20h+20m-5ee+ff)/32 \quad (4)$$

After all the ½ pixel signals are calculated, ¼ pixel signals are generated using an averaging filter Pixels a, c, i and k in FIG. 1 are generated by using an averaging filter in the horizontal direction for adjacent integral pixel signals or ½ pixel signals. For example, pixel a is calculated as the following Expression (5).

$$a=(G+b)/2 \quad (5)$$

Pixels d, f, n and q are generated by using an averaging filter in the vertical direction for adjacent integral pixel signals or ½ pixel signals. For example, pixel f is calculated as the following Expression (6).

$$f=(b+j)/2 \quad (6)$$

Pixels e, g, p and r are calculated using an averaging filter in a diagonal direction. For example, pixel r is calculated as the following Expression (7).

$$r=(m+s)/2 \quad (7)$$

In this way, according to the H.264 encoding system, a reference image with ¼ pixel accuracy is always generated from a reference image with an integral pixel accuracy by using a fixed 6-tap filter and a 2-tap averaging filter.

On the other hand, it is desirable to generate a reference image with a fractional pixel accuracy using a different filter depending on the frame, since video images have different motion quantities and frequency characteristics of pixel accuracy depending on the frame.

The following Non-patent Document 1 discloses that a reference image with ¼ pixel accuracy is generated by using a different filter depending on the frame. In concrete terms, a two-dimensional 6-tap filter, of which symmetry in the horizontal and vertical directions is limited is provided for each position (positions a, b, c, d, e, f, g, h, i, j, k, n, p, q and r in FIG. 1) with fractal pixel accuracy, and a reference image with ¼ pixel accuracy is directly generated by using each filter for the reference image with integral pixel accuracy. In this case, a filter for generating a reference image with ¼ pixel accuracy is changed for each frame, therefore information on 54 filter coefficients must be encoded and decoded for each frame.

Whereas in the following Non-patent Document 2, a filter for generating a reference image with ½ pixel accuracy is changed for each frame. In concrete terms, a reference image with ½ pixel accuracy is generated from a reference image with an integral pixel accuracy, by using a one-dimensional symmetrical 6-tap filter with such filter coefficients as (a1, a2, a3, a3, a2, a1). Since filter coefficients to generate a reference image with ½ pixel accuracy are different depending on the frame, information on three filter coefficients (a1, a2, a3) must be encoded and decoded for each frame.

Non-patent Document 1: Y. Vatis, B. Elder, D. Nguyen, J. Ostermann, "Motion- and Aliasing-Compensated Prediction Using a Two-Dimensional Non-Separable Adaptive Wiener Interpolation Filter," Proc. ICIP 2005, IEEE International Conference on Image Processing, Genova, Italy, September, 2005

Non-patent Document 2: T. Wedi, "Adaptive Interpolation Filter for Motion Compensated Hybrid Video Coding", Picture Coding Symposium (PCS 2001), 2001

DISCLOSURE OF THE INVENTION

Problem to be Solved by the Invention

According to the H.264 encoding system, a reference image with fractional pixel accuracy is always created by using a fixed filter, therefore a reference image matching the characteristics of each encoding target frame cannot be generated. According to Non-patent Document 1, 54 filter coefficients are encoded in order to create a reference image with ¼ pixel accuracy for each encoding target frame, therefore a problem is that the information of filter coefficients increases, and encoding efficiency drops. According to Non-patent Document 2, only three filter coefficients, to generate a ½ pixel signal for each encoding target frame, are encoded, so the code quantity of the filter coefficients is lower than Non-patent Document 1, but encoding the filter coefficients is still required. Since both Non-patent Document 1 and Non-patent Document 2 concern filters which are symmetric in the horizontal and vertical directions, another problem is that motion cannot be compensated at high accuracy if the video image has different characteristics in the horizontal and vertical directions.

With the foregoing in view, it is an object of the present invention to provide a video encoding device, video encoding method, video encoding program, video decoding device, video decoding method and video decoding program which can compensate motion at high accuracy even for video images having different characteristics in the horizontal direction and vertical direction, while decreasing the code quantity of the filter coefficients when a reference image with fractional image accuracy is generated using a filter for each encoding target frame, and is encoded or decoded with compensating motion.

Means for Solving the Problem

A video encoding device of the present invention is a video encoding device which creates a reference image with a fractional pixel accuracy and compensates a motion for a video image of a time series of frame images, by using a filter for each frame image, comprising: filter information storage means for storing a filter used for encoding of a frame image in the past; filter decision means for selecting and deciding a filter to be used for encoding of a current frame image from among a plurality of filter candidates including at least the filter stored in the filter information storage means; and filter information encoding means for encoding information indicating the filter decided by the filter decision means.

A video encoding method of the present invention is a video encoding method for a video encoding device creating a reference image with a fractional pixel accuracy and compensating motion, for a video image of a time series of frame images, by using a filter for each frame image, the method comprising: a filter information storage step in which the video encoding device stores a filter used for encoding of a frame image in the past; a filter decision step in which the video encoding device selects and decides a filter to be used for encoding of a current frame image from among a plurality of filter candidates including at least the filter stored in the filter information storage step; and a filter information encoding step in which the video encoding device encodes information indicating the filter decided in the filter decision step.

A video encoding program of the present invention is a video encoding program for causing a computer to function such that a reference image with a fractional pixel accuracy is created and motion is compensated for a video image of a time series of frame images, by using a filter for each frame image, characterized in that the computer is caused to function as: filter information storage means for storing a filter used for encoding of a frame image in the past; filter decision means for selecting and deciding a filter to be used for encoding of a current frame image from among a plurality of filter candidates including at least the filter stored in the filter information storage means; and filter information encoding means for encoding information indicating the filter decided by the filter decision means.

According to the video encoding device, video encoding method and video encoding program, when a reference image with a fractional pixel accuracy is generated, and motion is compensated using a filter for each frame for encoding, a filter is selected and decided from among a plurality of filter candidates including at least the filter used for encoding of the frame image of the past. Therefore it is sufficient to encode the information indicating the filter used for encoding of the frame image in the past, and as a result, the code quantity of the filter coefficients can be decreased. Since various filters can be used to create a reference image with a fractional pixel accuracy, motion can be compensated at high accuracy.

According to the video encoding device of the present invention, it is preferable that when the filter decided by the filter decision means is the filter used for encoding of the frame image in the past, the filter information encoding means encodes an identifier indicating the filter and an identifier identifying the frame image in the past for which the filter has been used.

According to the video encoding method of the present invention, it is preferable that in the filter information encoding step, when the filter decided in the filter decision step is the filter used for encoding of the frame image in the past, an identifier indicating the filter and an identifier identifying the frame image in the past, for which the filter has been used, are encoded.

In this case, if the filter used for encoding of the frame image in the past is decided as a filter to be used for encoding of the current frame image, the identifier indicating the filter used for encoding of the frame image in the past and the identifier identifying the frame image in the past, for which the filter has been used, are encoded. In other words, it is sufficient to encode these identifiers and unnecessary to encode the filter coefficient. As a result, the code quantity of the filter coefficients can be decreased.

According to the video encoding device of the present invention, it is preferable that when a plurality of the reference images exist, the filter information storage means stores the filter used for encoding of the frame image in the past for each of the reference images, and when a plurality of the reference images exist, the filter decision means selects a filter to be used for encoding of the current frame for each of the reference images, from among a plurality of filter candidates including at least the filter stored in the filter storage means.

According to the video encoding method of the present invention, it is preferable that in the filter information storage step, when a plurality of the reference images exist, the filter used for encoding the frame image in the past is stored for each of the reference images, and in the filter decision step, when a plurality of the reference images exist, a filter to be used for encoding of the current frame is selected for each of the reference images, from among a plurality of filter candidates including at least the filter stored in the filter storage step.

In this case, if a plurality of reference images exist, a filter to be used for encoding of the current frame is selected for each reference image, therefore it is possible to generate the reference images with fractional pixel accuracy, and compensate motion using a different filter for each reference image for encoding. Hence even if the frame image to be encoded has motion quantity and frequency characteristics with different pixel accuracy with respect to each reference image, motion can be compensated at high accuracy.

According to the video encoding device of the present invention, it is preferable that when a plurality of the reference images exist and the filter decided by the filter decision means is the filter used for encoding of the frame image in the past, the filter information encoding means encodes an identifier indicating the filter and an identifier identifying the filter information of the frame image in the past for which the filter has been used, for each of the reference images.

According to the video encoding method of the present invention, it is preferable that in the filter information encoding step, when a plurality of the reference images exist and the filter decided in the filter decision step is the filter used for encoding of the frame image in the past, an identifier indicating the filter and an identifier identifying the filter information of the frame in the past, for which the filter has been used, are encoded for each of the reference images.

In this case, if the filter used for encoding of the frame image in the past is decided as a filter to be used for encoding of the current frame image, the identifier indicating the filter used for encoding of the frame image in the past and the identifier identifying the frame image in the past, for which the filter has been used, are encoded. In other words, it is sufficient to encode these identifiers and unnecessary to encode the filter coefficients. As a result, the code quantity of the filter coefficients can be decreased. Since this encoding is executed for each reference image, motion can be compensated at high accuracy, even if the frame image to be encoded has motion quantity and frequency characteristics with different pixel accuracy with respect to each reference image.

A video encoding device of the present invention is a video encoding device which creates a reference image with a fractional pixel accuracy and compensates motion for a video image of a time series of frame images, by using a filter for each frame image, comprising: filter information storage means for storing a filter used for encoding a frame image in one preceding frame; filter decision means for selecting and deciding a filter to be used for encoding of the current frame image from among a plurality of filter candidates including at least the filter stored by the filter information storage means; and filter information encoding means for encoding information indicating the filter decided by the filter decision means.

A video encoding method of the present invention is a video encoding method for a video encoding device creating a reference image with a fractional pixel accuracy and compensating motion, for a video image of a time series of frame images, by using a filter for each frame image, the method comprising: a filter information storage step in which the video image encoding device stores a filter used for encoding a frame image in the one preceding frame; a filter decision step in which the video encoding device selects and decides a filter to be used for encoding of the current frame from among a plurality of filter candidates including at least the filter stored in the filter information storage step; and a filter information encoding step in which the video encoding device encodes information indicating the filter decided in the filter decision step.

According to the video encoding device and video encoding method, when a reference image with a fractional pixel accuracy is generated and motion is compensated using a filter for each frame for encoding, a filter is selected and decided from among a plurality of filter candidates including at least the filter used for encoding of the frame image in the one preceding frame. Therefore if the decided filter is the filter used for encoding of the frame image in the one preceding frame, it is sufficient to encode the information indicating the filter used for encoding of the frame image in the one preceding frame. As a result, the code quantity of the filter coefficients can be decreased.

According to the video encoding device of the present invention, it is preferable that when the filter decided by the filter decision means is the filter used for encoding of the frame image in the one preceding frame, the filter information encoding means encodes an identifier indicating the filter.

According to the video encoding method of the present invention, it is preferable that in the filter information encoding step, when the filter decided in the filter decision step is the filter used for encoding of the frame image in the one preceding frame, an identifier indicating the filter is encoded.

In this case, if the filter used for encoding of the frame image in the one preceding frame is decided as a filter to be used for encoding of the current frame image, the identifier indicating the filter used for encoding of the frame image in the one preceding frame is encoded. In other words, it is sufficient to encode this identifier and unnecessary to encode the filter coefficient. As a result, the code quantity of the filter coefficients can be decreased.

According to the video encoding device of the present invention, it is preferable that when a plurality of the reference images exist, the filter information storage means stores the filter used for encoding of the frame image in the one preceding frame for each of the reference images, and when a plurality of reference images exist, the filter decision means selects a filter to be used for encoding of the current frame for each of the reference images, from among a plurality of filter candidates including at least the filter stored in the filter storage means.

According to the video encoding method of the present invention, it is preferable that in the filter information storage step, when a plurality of the reference images exist, the filter used for encoding of the frame image in the one preceding frame is stored for each of the reference images, and in the filter decision step, when a plurality of reference images exist, a filter to be used for encoding of the current frame is selected for each of the reference images, from among a plurality of filter candidates including at least the filter stored in the filter storage step.

In this case, if a plurality of reference images exist, a filter to be used for encoding of the current frame is selected for each reference image, therefore it is possible to generate the reference images with fractional pixel accuracy and compensate motion using a different filter for each reference image for encoding. Hence even if the frame image to be encoded has motion quantity and frequency characteristics with different pixel accuracy with respect to each reference image, motion can be compensated at high precision.

According to the video encoding device of the present invention, it is preferable that when a plurality of the reference images exist and the filter decided by the filter decision means is the filter used for encoding of the frame image in the one preceding frame, the filter information encoding means encodes an identifier indicating the filter and an identifier identifying the filter information of the frame image in the past, for which the filter has been used, for each of the reference images.

According to the video encoding method of the present invention, it is preferable that in the filter information encoding step, when a plurality of the reference images exist and the filter decided in the filter decision step is the filter used for encoding of the frame image in the one preceding frame, an identifier indicating the filter and an identifier identifying the filter information of the frame image in the past, for which the filter has been used, are encoded for each of the reference images.

In this case, if the filter used for encoding of the frame image in the one preceding frame is decided as a filter to be used for encoding of the current frame image, the identifier indicating the decided filter and the identifier identifying the filter information of the frame image in the past, for which the filter has been used, are encoded. In other words, it is sufficient to encode the two identifiers and unnecessary to encode the filter coefficient. As a result, the encoding quantity of the filter coefficients can be decreased. Since this encode is executed for each reference image, motion can be compensated at high accuracy even if the frame image to be encoded has motion quantity and frequency characteristics with different pixel accuracy with respect to each reference image.

According to the video encoding device of the present invention, it is preferable that the filter decision means selects and decides a filter to be used for encoding of the current frame image from among the filter candidates, further including an asymmetric filter which is independent in the horizontal and vertical directions.

According to the video encoding method of the present invention, it is preferable that in the filter decision step, a filter to be used for encoding of the current frame image is selected and decided from among the filter candidates, further including an asymmetric filter which is independent in the horizontal and vertical directions.

In this case, the asymmetric filter, which is independent in the horizontal and vertical directions, is further included in the filter candidates, so if this asymmetric filter is decided as the filter to be used for encoding of the current frame image, motion can be compensated at high accuracy even for video images having different characteristics in the horizontal direction and vertical direction, with less code quantity of the filter coefficient.

According to the video encoding device of the present invention, it is preferable that when the filter decided by the filter decision means is the asymmetric filter, the filter information encoding means encodes an identifier indicating the asymmetric filter and a filter coefficient of the asymmetric filter.

According to the video encoding method of the present invention, it is preferable that in the filter information encoding step, when the filter decided in the filter decision step is the asymmetric filter, an identifier indicating the asymmetric filter and a filter coefficient of the asymmetric filter are encoded.

In this case, if the asymmetric filter is decided as the filter to be used for encoding of the current frame image, the identifier indicating the asymmetric filter which is independent in the horizontal and vertical directions and the filter coefficients of this filter are encoded. Therefore motion can be compensated at high accuracy even for video images having different characteristics in the horizontal direction and vertical direction, with less code quantity of the filter coefficients.

According to the video encoding device of the present invention, it is preferable that the filter decision means selects and decides a filter to be used for encoding of the current frame image from among the filter candidates, further including a predetermined standard filter.

According to the video encoding method of the present invention, it is preferable that in the filter decision step, a filter to be used for encoding of the current frame image is selected and decided from among the filter candidates, further including a predetermined standard filter.

In this case, the standard filter is further included in the filter candidates, so if this standard filter is decided as a filter to be used for encoding of the current frame image, it is sufficient to the encode the information indicating the standard filter. As a result, the code quantity of the filter coefficients can be decreased.

According to the video encoding device of the present invention, it is preferable that when the filter decided by the filter decision means is the standard filter, the filter information encoding means encodes an identifier indicating the standard filter.

According to the video encoding method, it is preferable that in the filter information encoding step, when the filter decided in the filter decision step is the standard filter, an identifier indicating the standard filter is encoded.

In this case, if the standard filter is decided, the identifier indicating this standard filter is encoded. In other words, it is sufficient to encode this identifier and unnecessary to encode the filter coefficients. As a result, the code quantity of the filter coefficients can be decreased.

A video decoding device of the present invention is a video decoding device which creates a reference image with a fractional pixel accuracy and compensates motion by using a filter for each frame image, and decodes a video image of a time series of frame images, comprising: filter information storage means for storing a filter used for decoding of a frame image in the past; and filter information decoding means for selecting a filter to be used for decoding of the current frame image from among a plurality of filter candidates including at least the filter stored in the filter information storage means, and performing decoding.

A video decoding method of the present invention is a video decoding method for creating a reference image with a fractional pixel accuracy and compensating motion using a filter for each frame image, and decoding a video image of a time series of frame images, the method comprising: a filter information storage step in which the video decoding device stores a filter used for decoding of a frame image in the past; and a filter information decoding step in which the video decoding device selects a filter to be used for decoding of the current frame image from among a plurality of filter candidates including at least a filter stored in the filter information storage step, and performing decoding.

A video decoding program of the present invention is a video decoding program for causing a computer to function such that a reference image with a fractional pixel accuracy is created and motion is compensated, and a video image of a time series of frame images is decoded by using a filter for each frame image, characterized in that the computer is caused to function as: filter information storage means for storing a filter used for decoding of a frame image in the past; and filter information decoding means for selecting a filter to be used for decoding of the current frame image from among a plurality of filter candidates including at least the filter stored in the filter information storage means, and performing decoding.

According to the above mentioned video decoding device, video decoding method and video decoding program, when a reference image with a fractional pixel accuracy is generated and motion is compensated using a filter for each frame for decoding, a filter is selected from among a plurality of filter candidates including at least the filter used for decoding of the frame image in the past. Therefore it is sufficient to decode the information indicating the filter used for decoding of the frame image in the past. As a result, the code quantity of the filter coefficients to be decoded can be decreased. Since various filters can be used to create a reference image with a fractional pixel accuracy, motion can be compensated at high accuracy.

According to the video decoding device of the present invention, it is preferable that the filter information decoding means decodes an identifier indicating the filter used for decoding of the frame image in the past, and an identifier identifying the frame image in the past for which the filter has been used.

According to the video decoding method of the present invention, it is preferable that in the filter information decoding step, an identifier indicating the filter used for decoding of the frame image in the past, and an identifier identifying the frame image in the past, for which the filter has been used, are decoded.

In this case, if the filter used for decoding of the frame image in the past is selected as a filter to be used for decoding of the current frame image, the identifier indicating the filter used for decoding of the frame image in the past and the identifier identifying the frame image in the past, for which the filter has been used, are decoded. In other words, it is sufficient to decode these identifiers and unnecessary to decode the filter coefficients. As a result, the code quantity of the filter coefficients to be decoded can be decreased.

According to the video decoding device of the present invention, it is preferable that when a plurality of the reference images exist, the filter information storage means stores the filter used for decoding of the frame image in the past for each of the reference images.

According to the video decoding method of the present invention, it is preferable that in the filter information storage step, when a plurality of the reference images exist, the filter used for decoding of the frame image in the past for each of the reference images is stored.

In this case, if a plurality of reference images exist, a filter to be used for encoding of the current frame is stored for each reference image, therefore it is possible to compensate motion of the reference image with fractional pixel accuracy using a different filter for each reference image, and perform decoding. As a result, motion can be compensated at high accuracy even if the frame image to be decoded has motion quantity and frequency characteristics with different pixel accuracy with respect to each reference image.

According to the video decoding device of the present invention, it is preferable that when a plurality of the reference images exist, the filter information decoding means decodes an identifier indicating the filter used for decoding of the frame image in the past and an identifier identifying the frame image in the past for which the filter has been used, for each of the reference images.

According to the video decoding method of the present invention, it is preferable that in the filter information decoding step, when a plurality of the reference images exist, an identifier indicating the filter used for decoding of the frame image in the past and an identifier identifying the frame image in the past, for which the filter has been used, are decoded, for each of the reference images.

In this case, if the filter used for decoding of the frame image in the past is selected as a filter to be used for decoding of the current frame image, the identifier indicating the filter used for decoding of the frame image in the past and the identifier identifying the frame image in the past, for which the filter has been used, are decoded. In other words, it is sufficient to decode these identifiers and unnecessary to decode the filter coefficients. As a result, the code quantity of the filter coefficients to be decoded can be decreased. Since this decoding is executed for each reference image, motion can be compensated at high accuracy, even if the frame image to be decoded has motion quantity and frequency characteristics with different pixel accuracy with respect to each reference image.

A video decoding device of the present invention is a video decoding device which creates a reference image with a fractional pixel accuracy and compensates motion, by using a filter for each frame image, and decoding a video image of a time series of frame images, comprising: filter information storage means for storing a filter used for decoding of a frame image in the one preceding frame; and filter information decoding means for selecting a filter to be used for decoding of the current frame image from among a plurality of filter candidates including at least the filter stored in the filter information storage means, and performing decoding.

A video decoding method of the present invention is a video decoding method for a video decoding device creating a reference image with a fractional pixel accuracy and compensating motion using a filter for each frame image, and decoding a video image of a time series of frame images, the method comprising: a filter information storage step in which the video decoding device stores a filter used for decoding of a frame image in one preceding frame; and a filter information decoding step in which the video decoding device selects a filter to be used for decoding of the current frame image from among a plurality of filter candidates including at least the filter stored in the filter information storage step, and performing decoding.

According to the above mentioned video decoding device and video decoding method, when a reference image with a fractional pixel accuracy is generated and motion is compensated using a filter for each frame for decoding, a filter is selected from among a plurality of filter candidates including at least the filter used for decoding of the frame image in the one preceding frame. Therefore it is sufficient to decode the information indicating the filter used for decoding of the frame image in the one preceding frame. As a result, the code quantity of the filter coefficients to be decoded can be decreased.

According to the video decoding device of the present invention, it is preferable that the filter information decoding means decodes an identifier indicating the filter used for decoding of the frame image in the one preceding frame.

According to the video decoding method of the present invention, it is preferable that in the filter information decoding step, an identifier indicating the filter used for decoding of the frame image in the one preceding frame is decoded.

In this case, if the filter used for decoding of the frame image in the one preceding frame is selected as the filter to be used for decoding of the current frame image, the identifier indicating the filter used for decoding of the frame image in the one preceding frame is decoded. In other words, it is sufficient to decode this identifier and unnecessary to decode the filter coefficient. As a result, the code quantity of the filter coefficients to be decoded can be decreased.

According to the video decoding device of the present invention, it is preferable that when a plurality of the reference images exist, the filter information storage means stores the filter used for decoding of the frame image in the one preceding frame for each of the reference images.

According to the video decoding method of the present invention, it is preferable that in the filter information storage step, when a plurality of the reference images exist, the filter used for decoding of the frame image in the one preceding frame is stored for each of the reference images.

In this case, if a plurality of reference images exist, a filter to be used for decoding of the frame image in the one preceding frame is stored for each reference image, therefore it is possible to compensate motion of the reference image with fractional pixel accuracy using a different filter for each reference image, and perform decoding. As a result, motion can be compensated at high accuracy, even if the frame image to be decoded has motion quantity and frequency characteristics with different pixel accuracy with respect to each reference image.

According to the video decoding device of the present invention, it is preferable that when a plurality of the reference images exist, the filter information decoding means decodes an identifier indicating the filter used for decoding of the frame image in the one preceding frame for each of the reference images.

According to the video decoding method of the present invention, it is preferable that in the filter information decoding step, when a plurality of the reference images exist, an identifier indicating the filter used for decoding of the frame image in the one preceding frame is decoded for each of the reference images.

In this case, if the filter used for decoding of the frame image in the one preceding frame is selected as a filter to be used for decoding of the current frame image, the identifier indicating the filter used for decoding of the frame image in the one preceding frame is decoded. In other words, it is sufficient to decode this identifier and unnecessary to decode the filter coefficients. As a result, the code quantity of the filter coefficients to be decoded can be decreased. Since this decoding is executed for each reference image, motion can be compensated at high accuracy even if the frame image to be decoded has motion quantity and frequency characteristics with different pixel accuracy with respect to each reference image.

According to the video decoding device of the present invention, it is preferable that the filter information decoding means selects a filter to be used for decoding of the current frame image from among the filter candidates further including an asymmetric filter which is independent in the horizontal and vertical directions, and performs decoding.

According to the video decoding method of the present invention, it is preferable that in the filter information decoding step, a filter to be used for decoding of the current frame image is selected from among the filter candidates further including an asymmetric filter, which is independent in the horizontal and vertical directions, and decoding is performed.

In this case, the asymmetric filter, which is independent in the horizontal and vertical directions, is further included. Therefore if this asymmetric filter is selected as the filter to be used for decoding of the current frame image, motion can be compensated at high accuracy even for video images having different characteristics in the horizontal direction and vertical direction, with less code quantity of filter coefficients to be decoded.

According to the video decoding device of the present invention, it is preferable that the filter information decoding means decodes an identifier indicating the asymmetric filter and filter coefficients of the asymmetric filter.

According to the video decoding method of the present invention, it is preferable that in the filter information decoding step, an identifier indicating the asymmetric filter and filter coefficients of the asymmetric filter are decoded.

In this case, if the asymmetric filter, which is independent in the horizontal and vertical directions, is selected as the filter to be used for decoding of the current frame image, the identifier indicating the asymmetric filter and the filter coefficient of the asymmetric filter are decoded. Therefore motion can be compensated at high accuracy, even for video images having different characteristics in the horizontal direction and vertical direction even if the code quantity of the filter coefficients to be decoded is low.

According to the video decoding device of the present invention, it is preferable that the filter information decoding means selects a filter to be used for decoding of the current frame image from among the filter candidates further including a predetermined standard filter, and performs decoding.

According to the video decoding method of the present invention, it is preferable that in the filter information decoding step, a filter to be used for decoding of the current frame image is selected from among the filter candidates further including a predetermined standard filter, and decoding is performed.

In this case, the standard filter is included in the filter candidates, so if this standard filter is selected as a filter to be used for decoding of the current frame image, it is sufficient to decode the information indicating the standard filter. As a result, the code quantity of the filter coefficients to be decoded can be decreased.

According to the video decoding device of the present invention, it is preferable that the filter information decoding means decodes an identifier indicating the standard filter.

According to the video decoding method of the present invention, it is preferable that in the filter information decoding step, an identifier indicating the standard filter is decoded.

In this case, if the standard filter is selected as a filter to be decoded for the current frame image, the identifier indicating this standard filter is decoded. In other words, it is sufficient to decode this identifier and unnecessary to decode the filter coefficient. As a result, the code quantity of the filter coefficients to be decoded can be decreased.

Effect of the Invention

According to the above mentioned video encoding device, video encoding method, video encoding program, video decoding device, video decoding method and video decoding program, when a reference image with the fractional image accuracy is generated using a filter for each frame and is encoded or decoded with compensating motion, motion can be compensated at high accuracy even for video images having different characteristics in the horizontal direction and vertical direction, while decreasing the code quantity of the filter coefficients.

Figure 1:
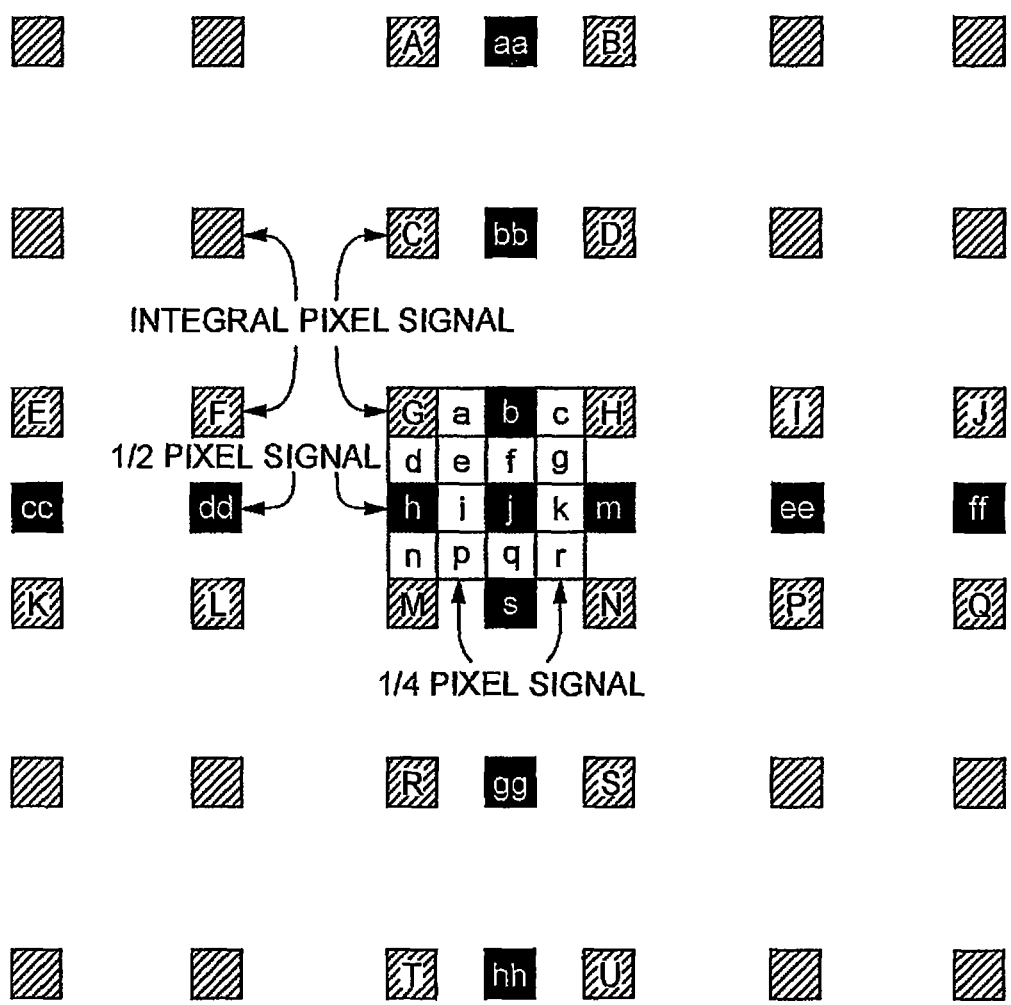
FIG. 1 is a diagram depicting an arrangement of pixels of a reference image having ¼ pixel accuracy.

EXPLANATION OF REFERENCE NUMERALS 20 video encoding device
70 video encoding program
80 video decoding device
110 video decoding program
202 filter decision unit (filter decision means)
203 filter information storage unit (filter information storage means)
205 filter information encoding unit (filter information encoding means)
703 filter decision module
704 filter information storage module
706 filter information encoding module
802 filter information decoding unit (filter information decoding means)
803 filter information storage unit (filter information storage means)
1103 filter information decoding module
1104 filter information storage module
20201 filter coefficient decision unit
20202 filter encoding efficiency calculation unit
20203 filter encoding efficiency calculation unit
20204 filter encoding efficiency calculation unit
20205 encoding efficiency comparison unit

DETAILED DESCRIPTION OF THE PREFERRED EMBODIMENTS

First Embodiment

A video encoding device, video encoding method, video encoding program, video decoding device, video decoding method and video decoding program according to the first embodiment of the preset invention will now be described with reference to the drawings. In each drawing, identical elements are denoted with an identical symbol, where redundant description is omitted.

Figure 2:
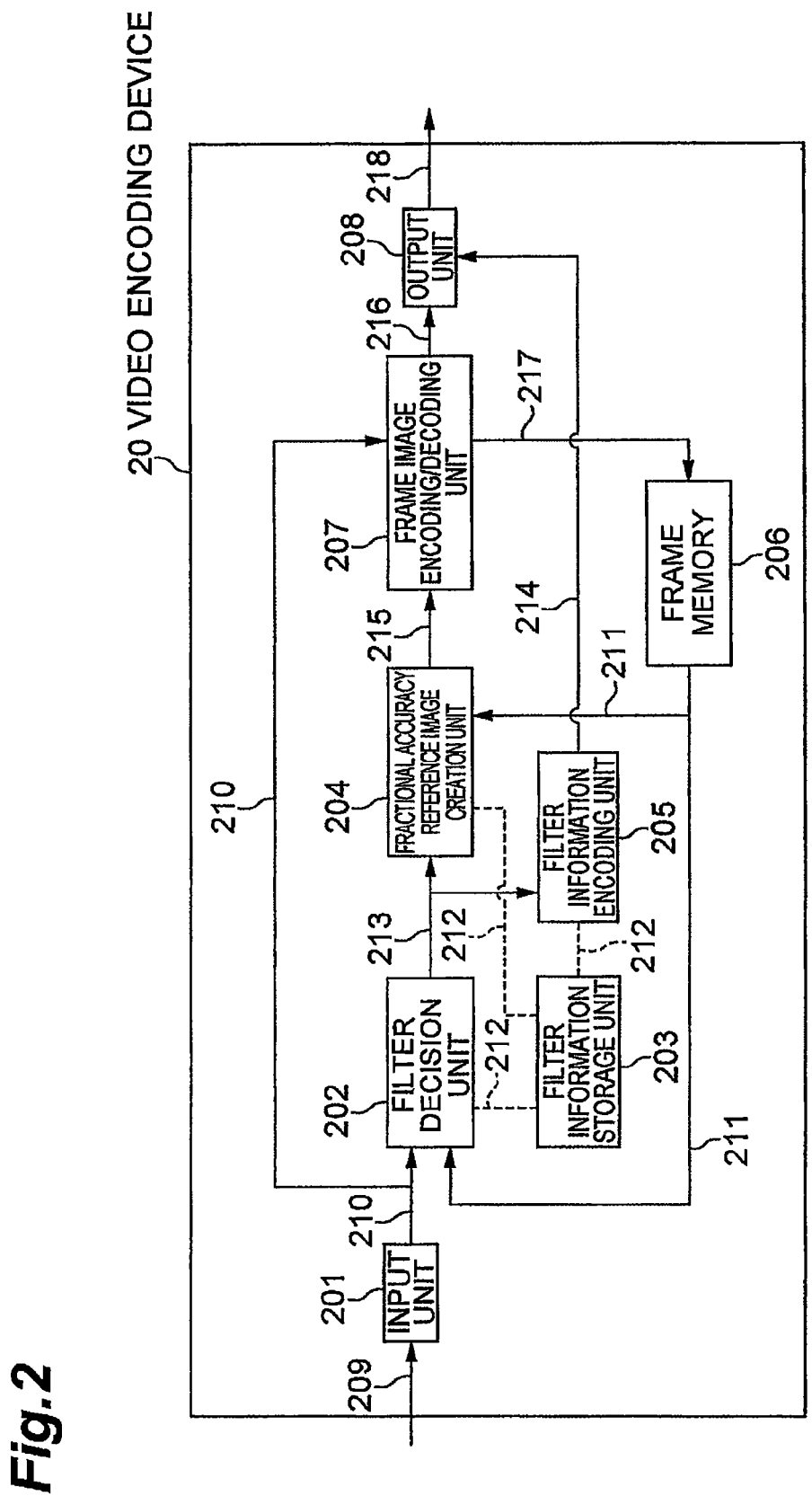
FIG. 2 is a block diagram depicting a configuration of a video encoding device according to the first embodiment.

FIG. 2 is a block diagram depicting a configuration of a video encoding device 20 according to the present embodiment. The video encoding device 20 has an input unit 201, filter decision unit (filter decision means) 202, filter information storage unit (filter information storage means) 203, fractional accuracy reference image creation unit 204, filter information encoding unit (filter information encoding means) 205, frame memory 206, frame image encoding/decoding unit 207 and output unit 208, as functional composing elements.

The input unit 201 separates an input video signal 209, which is comprised of a time series of frame images being input from the outside, into encoding target frame images 210, and outputs the images to the filter decision unit 202 and frame image encoding/decoding unit 207.

The frame memory 206 holds frame images already decoded in the past, and outputs these frame images to the filter decision unit 202 and fractional accuracy reference image creation unit 204 as reference images 211.

The filter information storage unit 203 holds a filter used for creating a reference image with a fractional accuracy when a frame image in one preceding frame is encoded (previous frame filter information 212). The previous frame filter information 212 is referred to by the filter decision unit 202 and fractional accuracy reference image creation unit 204. The previous frame filter information 212 is referred to and updated by the filter information encoding unit 205.

The filter decision unit 202 decides filter information 213 for creating a reference image with fractional accuracy to encode the current encoding target frame image, while referring to the previous frame filter information 212 in the filter information storage unit 203, using the frame image 210 which was input from the input unit 201 and the reference image 211 which was input from the frame memory 206, and outputs it to the fractional accuracy reference image creation unit 204 and the filter information encoding unit 205.

The filter information encoding unit 205 creates a filter information encoded bit stream 214 by encoding the filter information 213 while referring to the previous frame filter information 212 in the filter information storage unit 203, using the filter information 213 which was input from the filter decision unit 202, and outputs it to the output unit 208. The filter information encoding unit 205 also uses the filter information 213 which was input from the filter decision unit, so as to update the previous frame filter information 212 in the filter information storage unit 203 to the filter information 213.

The fractional accuracy reference image creation unit 204 creates a fractional accuracy reference image 215 using the filter information 213 which was input from the filter decision unit 202 and the reference image 211 which was input from the frame memory 206, and outputs it to the frame image encoding/decoding unit 207.

The frame image encoding/decoding unit 207 compensates motion using the frame image 210 which was input from the input unit 201 and the fractional accuracy reference image 215 which was input from the fractional accuracy reference image creation unit 204, encodes the encoding target frame, and outputs a frame image encoded bit stream 216 to the output unit 208. The frame image encoding/decoding unit 207 also locally decodes the encoded frame image, and outputs the decoded frame image to the frame memory 206 as a decoded frame image 217.

The output unit 208 combines the filter information encoded bit stream 214 which was input from the filter information encoding unit 205 and the frame image encoded bit stream 216 which was input from the frame image encoding/decoding unit 207, and outputs it to the outside.

Now the filter decision unit 202, filter information storage unit 203, fractional accuracy reference image creation unit 204, filter information encoding unit 205 and output unit 208 will be described in detail.

Figure 3:
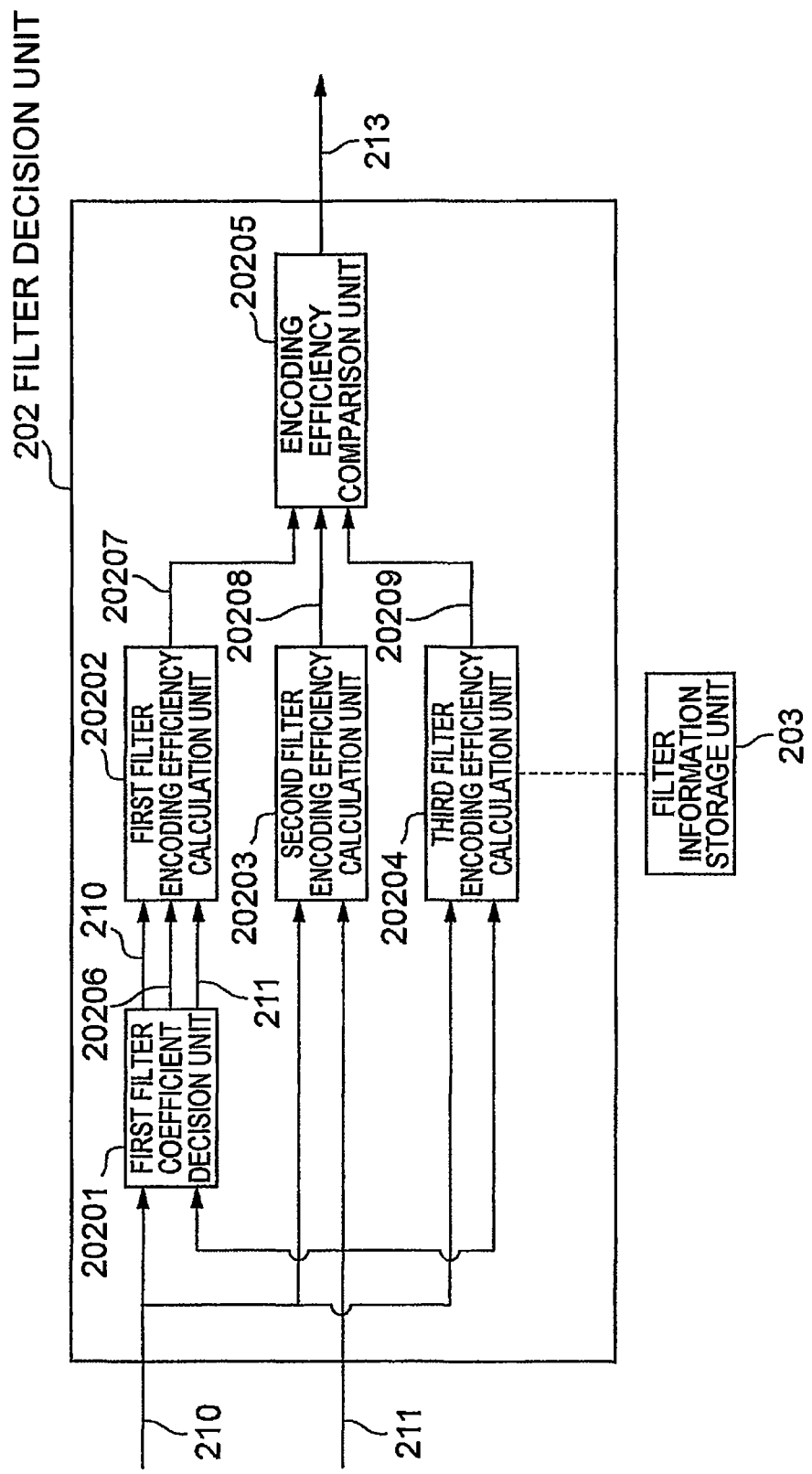
FIG. 3 is a block diagram depicting the filter decision unit shown in FIG. 2.

First the filter decision unit 202 will be described with reference to FIG. 3. The filter decision unit 202 has a first filter coefficient decision unit 20201, a first filter encoding efficiency calculation unit 20202, a second filter encoding efficiency calculation unit 20203, third filter encoding efficiency calculation unit 20204 and encoding efficiency comparison unit 20205 as functional composing elements.

The first filter coefficient decision unit 20201 decides a first filter 20206 for creating a reference image with ½ pixel accuracy which is asymmetric and independent in the horizontal and vertical directions, using the frame image 210 which was input from the input unit 201 and the reference image 211 which was input from the frame memory 206. The first filter is a one-dimensional filter of which coefficients are 6-taps each in the horizontal direction (b1, b2, b3, b4, b5 and b6) and vertical direction (h1, h2, h3, h4, h5 and h6) (b1 to b6 and h1 to h6 are real numbers). The first filter coefficient decision unit 20201 outputs the decided first filter 20206, frame image 210 and reference image 211 to the first filter encoding efficiency calculation unit 20202.

The method for deciding the first filter 20206 will be described in detail. First the first filter coefficient decision unit 20201 sets the coefficients b1 to b6 and h1 to h6 to predetermined values (values may be different in all coefficients or a plurality of coefficients may have an identical value). Then the first filter coefficient decision unit 20201 filters the reference image 211 using a one-dimensional filter defined by the coefficient being set. The first filter coefficient decision unit 20201 compensates motion using the frame image 210 and the filtered reference image 211, and calculates the difference between the frame image 210 and the image after motion compensation. The first filter coefficient decision unit 20201 repeats these processings for a predetermined number of times, while changing the values of the coefficients b1 to b6 and h1 to h6, and finally decides on a one-dimensional filter with which the smallest difference value was calculated, as the first filter 20206. The method for deciding the first filter 20206, however, is not limited to this.

The first filter encoding efficiency calculation unit 20202 uses the first filter 20206 which was input from the first filter coefficient decision unit 20201, the frame image 210 and the reference image 211, so as to generate a reference image with ¼ pixel accuracy from the reference image 211 by the first filter, and calculates code quantity when the frame image 210 is encoded using the reference image.

A method for generating the reference image with ¼ pixel accuracy from the reference image 211 using the first filter will now be described. First the first filter encoding efficiency calculation unit 20202 generates a reference image with ½ pixel accuracy of the reference image 211 using the first filter 20206. This will be described in concrete terms with reference to FIG. 1. The pixel b is calculated as the following Expression (8) by using the horizontal 6-tap filter (b1, b2, b3, b4, b5, b6) for the integral pixels E, F, G, H, I and J.

$$b = (b1 \times E + b2 \times F + b3 \times G + b4 \times H + b5 \times I + b6 \times J) \tag{8}$$

The pixel h is calculated as the following Expression (9) by using the vertical 6-tap filter (h1, h2, h3, h4, h5, h6) for the integral pixels A, C, G, M R and T.

$$h = (h1 \times A + h2 \times C + h3 \times G + h4 \times M + h5 \times R + h6 \times T) \tag{9}$$

The ½ pixel signal in a mid-position of the four integral pixel signals is generated by a mean value of adjacent ½ pixel signals. Therefore pixel j is calculated as the following Expression (10) by calculating the mean value of the ½ pixel signals b, h, m and s.

$$j = (b+h+m+s)/4 \tag{10}$$

Then the first filter encoding efficiency calculation unit 20202 generates a reference image with ¼ pixel accuracy from the reference image with ½ pixel accuracy. [This processing] will also be described with reference to FIG. 1. The pixels a, c, i and k are generated by using a horizontal averaging filter for adjacent integral pixel signals or ½ pixel signals.

$$a = (G+b)/2 \tag{11}$$

$$c = (b+H)/2 \tag{12}$$

$$i = (h+j)/2 \tag{13}$$

$$k = (j+m)/2 \tag{14}$$

The pixels d, f, n and q are generated by using a vertical averaging filter for adjacent integral pixel signals or ½ pixel signals.

$$d = (G+h)/2 \tag{15}$$

$$f = (b+j)/2 \tag{16}$$

$$n = (h+M)/2 \tag{17}$$

$$q = (j+s)/2 \tag{18}$$

The pixels e, g, p and r are generated by using a mean value of adjacent integral pixel signals or ½ pixel signals.

$$e = (G+b+h+j)/4 \tag{19}$$

$$g = (b+H+j+m)/4 \tag{20}$$

$$p = (h+j+M+s)/4 \tag{21}$$

$$r = (j+m+s+N)/4 \tag{22}$$

The first filter encoding efficiency calculation unit 20202 calculates a total value S1 of the code quantity when the frame image 210 was encoded using the created reference image with ¼ pixel accuracy and the code quantity when the filter coefficients (b1, b2, b3, b4, b5, b6) and (h1, h2, h3, h4, h5, h6) of the first filter were encoded. Then the first filter encoding efficiency calculation unit 20202 outputs the first filter and the code quantity S1 to the encoding efficiency comparison unit 20205 as the first filter information 20207.

The second filter encoding efficiency calculation unit 20203 uses the frame image 210, reference image 211 and the second filter, which is a standard filter which has been held in the second filter encoding efficiency calculation unit 20203, so as to generate a reference image with ¼ pixel accuracy from the reference image 211, and calculates code quantity when the frame image 210 is encoded using the reference image. This standard filter is a one-dimensional 6-tap filter (1, −5, 20, 20, −5, 1)/32, which is identically symmetric in the horizontal and vertical directions.

A method for generating the reference image with ¼ pixel accuracy from the reference image 211 using the second filter will be described. First the second filter encoding efficiency calculation unit 20203 generates a reference image with ½ pixel accuracy of the reference image 211 using the second filter. This will be described in concrete terms with reference to FIG. 1. The pixel b is calculated as the following Expression (23) by using the horizontal reference filter for the integral pixels E, F, G, H, I and J.

$$b = (E - 5F + 20G + 20H - 5I + J)/32 \tag{23}$$

The pixel h is calculated as the following Expression (24) by using the vertical reference filter for the integral pixels A, C, G, M, R and T.

$$h = (A - 5C + 20G + 20M - 5R + T)/32 \tag{24}$$

The ½ pixel signal in a mid-position of four integral pixel signals is generated by using the 6-tap filter in both horizontal and vertical directions. The pixel j is calculated as the following Expression (25) by generating ½ pixel signals aa, bb, b, s, gg and hh using the horizontal 6-tap filter, and then using the vertical 6-tap filter on these signals.

$$j=(aa-5bb+20b+20s-5gg+hh)/32 \quad (25)$$

The pixel j may also be generated as the following Expression (26) by generating the ½ pixel signals cc, dd, h, m, ee and ff by vertical filtering, and then performing horizontal filtering.

$$j=(cc-5dd+20h+20m-5ee+ff)/32 \quad (26)$$

Then the second filter encoding efficiency calculation unit 20203 generates a reference image with ¼ pixel accuracy from the reference image with ½ pixel accuracy. [This processing] will also be described with reference to FIG. 1. The pixels a, c, i and k are generated by using a horizontal averaging filter for adjacent integral pixel signals or ½ pixel signals.

$$a=(G+b)/2 \quad (27)$$

$$c=(b+H)/2 \quad (28)$$

$$i=(h+j)/2 \quad (29)$$

$$k=(j+m)/2 \quad (30)$$

The pixels d, f, n and q are generated by using a vertical averaging filter for adjacent integral pixel signals or ½ pixel signals.

$$d=(G+h)/2 \quad (31)$$

$$f=(b+j)/2 \quad (32)$$

$$n=(h+M)/2 \quad (33)$$

$$q=(j+s)/2 \quad (34)$$

The pixels e, g, p and r are calculated by using a diagonal averaging filter.

$$e=(b+h)/2 \quad (35)$$

$$g=(b+m)/2 \quad (36)$$

$$p=(h+s)/2 \quad (37)$$

$$r=(m+s)/2 \quad (38)$$

The second filter encoding efficiency calculation unit 20203 calculates a code quantity S2 when the frame image 210 was encoded using the created reference image with ¼ pixel accuracy. Then the second filter encoding efficiency calculation unit 20203 outputs the code quantity S2 to the encoding efficiency comparison unit 20205 as the second filter information 20208.

The third filter encoding efficiency calculation unit 20204 refers to the previous frame filter information 212 in the filter information storage unit 203, generates a reference image with ¼ pixel accuracy from the reference image 211 using a third filter, which is a filter for creating a reference image with ½ pixel accuracy, which was used when the frame image in the previous frame was encoded, and calculates the code quantity when the frame image 210 is encoded using this reference image.

A method for generating the reference image with ¼ pixel accuracy from the reference image 211 using the third filter will be described. First the third filter encoding efficiency calculation unit 20204 generates a reference image with ½ pixel accuracy of the reference image 211 using the third filter, which is a filter for creating the reference image with ½ pixel accuracy, which was used when the frame image in the previous frame was encoded. This will be described concretely with reference to FIG. 1. It is assumed that the third filter is set to horizontal direction (b1', b2', b3', b4', b5', b6') and vertical direction (h1', h2', h3', h4', h5', h6') (b1' to b6' and h1' to h6' are real numbers). The pixel b is calculated as the following Expression (39) by using the horizontal 6-tap filter (b1', b2', b3', b4', b5', b6') for the integral pixels E, F, G, H, I and J.

$$b=(b1'\times E+b2'\times F+b3'\times G+b4'\times H+b5'\times I+b6'\times J) \quad (39)$$

The pixel h is calculated as the following Expression (40) by using the vertical 6-tap filter (h1', h2', h3', h4', h5', h6') for the integral pixels A, C, G, M, R and T.

$$h=(h1'\times A+h2'\times C+h3'\times G+h4'\times M+h5'\times R+h6'\times T) \quad (40)$$

The ½ pixel signal in the mid-position of the four integral pixel signals is generated by using a mean value of the adjacent ½ pixel signals. Therefore the pixel j is calculated as the following Expression (41) by calculating the mean value of the ½ pixel signals b, h, m and s.

$$j=(b+h+m+s)/4 \quad (41)$$

Then the third filter encoding efficiency calculation unit 20204 generates a reference image with ¼ pixel accuracy of the reference image 211 from the reference image with ½ pixel accuracy. [This processing] will also be described with reference to FIG. 1. The pixels a, c, i and k are generated by using a horizontal averaging filter for adjacent integral pixel signals or ½ pixel signals.

$$a=(G+b)/2 \quad (42)$$

$$c=(b+H)/2 \quad (43)$$

$$i=(h+j)/2 \quad (44)$$

$$k=(j+m)/2 \quad (45)$$

The pixels d, f, n and q are generated by using a vertical averaging filter for adjacent integral pixel signals or ½ pixel signals.

$$d=(G+h)/2 \quad (46)$$

$$f=(b+j)/2 \quad (47)$$

$$n=(h+M)/2 \quad (48)$$

$$q=(j+s)/2 \quad (49)$$

The pixels e, g, p and r are generated by a mean value of adjacent pixel signals or ½ pixel signals.

$$e=(G+b+h+j)/4 \quad (50)$$

$$g=(b+H+j+m)/4 \quad (51)$$

$$p=(h+j+M+s)/4 \quad (52)$$

$$r=(j+m+s+N)/4 \quad (53)$$

The third filter encoding efficiency calculation unit 20204 calculates a code quantity S3 when the frame image 210 was encoded using the created reference image with ¼ pixel accuracy. Then the third filter encoding efficiency calculation unit 20204 outputs the code quantity S3 to the encoding efficiency comparison unit 20205 as the third filter information 20209.

The encoding efficiency comparison unit 20205 selects a filter with the least code quantity, out of the three filters, using the first filter information 20207 which was input from the first filter encoding efficiency calculation unit 20202, second filter information 20208 which was input from the second filter encoding efficiency calculation unit 20203, and the third filter information 20209 which was input from the third filter encoding efficiency calculation unit 20204, and outputs this filter information 213 to the fractional accuracy reference image creation unit 204 and filter information encoding unit 205.

In concrete terms, the encoding efficiency comparison unit 20205 compares the code quantity S1, code quantity S2 and code quantity S3, and selects a filter with the least code quantity. If the code quantity S1 is the least, the encoding efficiency comparison unit 20205 outputs the identifier "1" to indicate the first filter, and coefficients (b1, b2, b3, b4, b5, b6) and (h1, h2, h3, h4, h5, h6) of the first filter to the fractional accuracy reference image creation unit 204 and the filter information encoding unit 205 as the filter information 213. If the code quantity S2 is the least, the encoding efficiency comparison unit 20205 outputs the identifier "2" to indicate the second filter to the fractional accuracy reference image creation unit 204 and filter information encoding unit 205 as the filter information 213. If the code quantity S3 is the least, the encoding efficiency comparison unit 20205 outputs the identifier "3" to indicate the third filter to the fractional accuracy reference image creation unit 204 and filter information encoding unit 205 as the filter information 213.

Now the fractional accuracy reference image creation unit 204 will be described in detail. The fractional accuracy reference image creation unit 204 creates a fractional accuracy reference image 215 with ¼ pixel accuracy using the reference image 211 which was input from the frame memory 206 and filter information 213 which was input from the filter decision unit 202.

If the filter identifier included in the filter information 213 is "1", the fractional accuracy reference image creation unit 204 creates, with reference to information from the filter information storage unit 203, a fractional accuracy reference image 215 with ¼ pixel accuracy by the above Expressions (8) to (22), using the filter coefficients (b1, b2, b3, b4, b5, b6) and (h1, h2, h3, h4, h5, h6) included in the filter information 213. If the filter identifier included in the filter information 213 is "2", the fractional accuracy reference image creation unit 204 creates a fractional accuracy reference image 215 with ¼ pixel accuracy by the above Expressions (23) to (38), using the standard filter (1, −5, 20, 20, −5, 1)/32 for both horizontal and vertical directions. If the filter identifier included in the filter information 213 is "3", the fractional accuracy reference image creation unit 204 creates a fractional accuracy reference image 215 with ¼ pixel accuracy by the above Expressions (39) to (53) using the filter coefficients (b1', b2', b3', b4', b5', b6') and (h1', h2', h3', h4', h5', h6') which are previous frame filter information 212.

Then fractional accuracy reference image creation unit 204 outputs the created fractional accuracy reference image 215 to the frame image encoding/decoding unit 207.

Now the filter information encoding unit 205 will be described in detail. First the filter information encoding unit 205 encodes a filter identifier included in the filter information 213 which was input from the filter decision unit 202.

If the filter identifier is "1", the filter information encoding unit 205 encodes the filter coefficients (b1, b2, b3, b4, b5, b6) and (h1, h2, h3, h4, h5, h6) of the first filter included in the filter information 213. In this case, the filter information encoding unit 205 refers to the previous frame filter information 212 of the filter information storage unit 203, and encodes the difference of each filter coefficient from the corresponding value of the previous frame filter information 212. In other words, if the filter coefficient of the previous frame filter information 212 is (b1', b2', b3', b4', b5', b6') in the horizontal direction and is (h1', h2', h3', h4', h5', h6') in the vertical direction, the filter information encoding unit 205 encodes the filter coefficients (b1-b1', b2-b2', b3-b3', b4-b4', b5-b5', b6-b6') in the horizontal direction and (h1-h1', h2-h2', h3-h3', h4-h4', h5-h5', h6-h6') in the vertical direction.

Then the filter information encoding unit 205 outputs the filter information encoded bit stream 214, encoded above, to the output unit 208. If the filter identifier is "1", the filter information encoding unit 205 updates the previous frame filter information 212 of the filter information storage unit 203 to the first filter. If the filter identifier is "2", the filter information encoding unit 205 updates the previous frame filter information 212 of the filter information storage unit 203 to the second filter (standard filter). If the filter identifier is "3", the filter information encoding unit 205 updates the previous frame filter information 212 of the filter information storage unit 203 to the third filter, which is the same filter information.

The output unit 208 inserts the filter information encoded bit stream 214 before the frame image encoded bit stream 216, for each encoding target frame, so as to combine the two bit streams, and outputs these [combined bit streams] to the outside.

Figure 4:
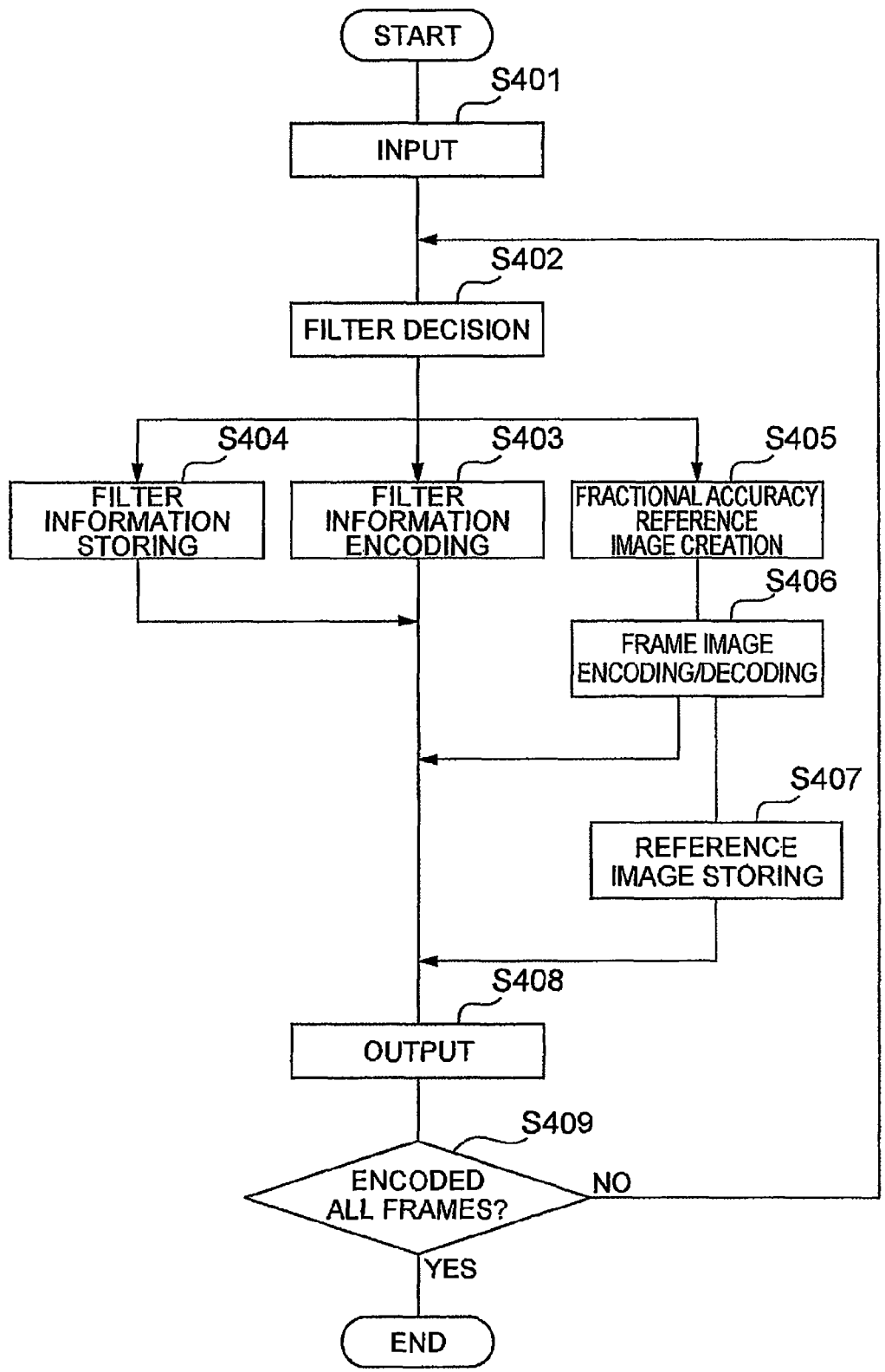
FIG. 4 is a flow chart depicting a video encoding method according to the first embodiment.

Now the operation of the video encoding method according to the present embodiment will be described with reference to FIG. 4. FIG. 4 is a flow chart depicting the video encoding method, which is an operation of the video encoding device 20 according to the present embodiment.

First the input unit 201 separates the input video signal 209, which is comprised of a time series of frame images, which was input from the outside, into encoding target frame images 210 (input step S401).

Then the filter decision unit 202 decides the filter information 213 for creating a reference image with a fractional accuracy, using the frame image 210 and the reference image 211 (filter decision step S402).

The filter information encoding unit 205 encodes the filter information 213, and generates the filter information encoded bit stream 214 (filter information encoding step S403).

The filter information encoding unit 205 stores the filter information 213 in the filter information storage unit 203 as the previous frame filter information 212 (filter information storage step S404).

On the other hand, the fractional accuracy reference image creation unit 204 creates a fractional accuracy reference image 215 using the filter information 213 and reference image 211 (fractional accuracy reference image creation step S405).

The frame image encoding/decoding unit 207 encodes the encoding target frame using the frame image 210 and the fractional accuracy reference image 215, and generates the frame image encoded bit stream 216 (frame image encoding/decoding step S406).

The frame image encoding/decoding unit 207 locally decodes the encoded frame image, and stores it in the frame memory 206 as decoded frame image 217 (reference image storage step S407).

The output unit 208 combines the filter information encoded bit stream 214 and the frame image encoded bit stream 216, and outputs [the combined bit stream] to the outside (outside step S408).

It is judged whether encoding of all the frame images completed (step S409), and if encoding of all the frame images completed (step S409: YES), processing ends. If encoding of all the frame images did not complete (step S409:

NO), the previous frame filter information 212 and reference image 211 are updated, and processing is repeated from step S402.

Figure 5:
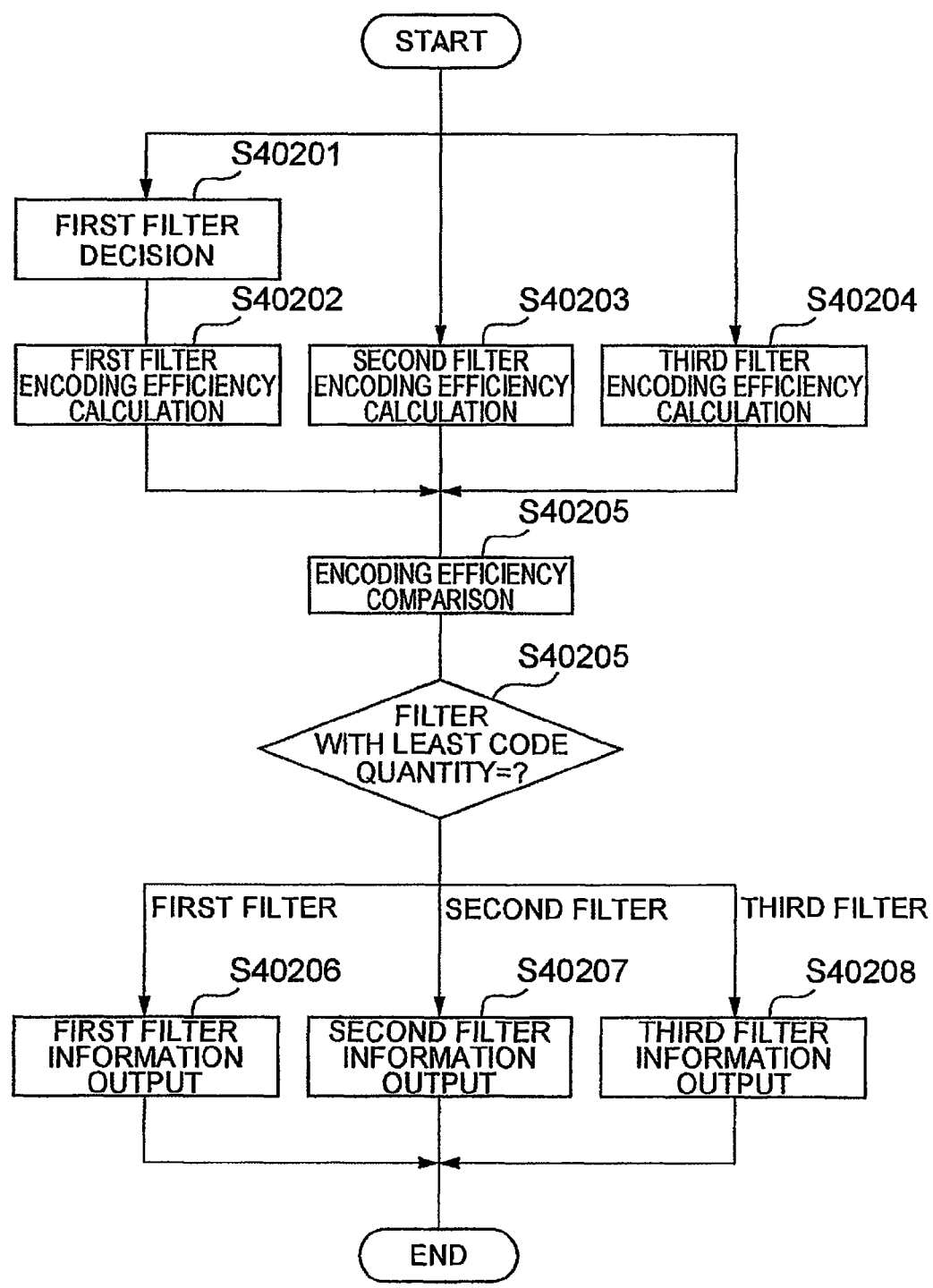
FIG. 5 is a flow chart depicting the filter decision step shown in FIG. 4.

Now the filter decision step S402 will be described in detail with reference to FIG. 5. FIG. 5 is a flow chart depicting the filter decision step S402, which is an operation of the filter decision unit 202.

First the first filter coefficient decision unit 20201 decides a first filter 20206, which is independent in the horizontal and vertical directions, and is asymmetric, for creating a reference image with ½ pixel accuracy, using the frame image 210 and the reference image 211 (first filter decision step S40201).

Then the first filter encoding efficiency calculation unit 20202 generates a reference image with ¼ pixel accuracy from the reference image 211 by the first filter using the first filter coefficients 20206 and reference image 211, and calculates the code quantity S1 when the frame image 210 is encoded using this reference image (first filter encoding efficiency calculation step S40202).

The second filter encoding efficiency calculation unit 20203 generates a reference image with ¼ pixel accuracy from the reference image 211, using the frame image 210, reference image 211 and the second filter, which is a reference filter which has been held in the second filter encoding efficiency calculation unit 20203, and the code quantity S2, when the frame image 210 is encoded using this reference image, is calculated (second filter encoding efficiency calculation step S40203).

The third filter encoding efficiency calculation unit 20204 generates a reference image with ¼ pixel accuracy from the reference image 211, using the third filter, which is a filter for creating a reference image with ½ pixel accuracy, and was used when the frame image in the previous frame was encoded, and calculates the code quantity S3 when the frame image 210 is encoded using this reference image (third filter encoding efficiency calculation step S40204).

The encoding efficiency comparison unit 20205 compares the code quantity S1, code quantity S2 and code quantity S3 (encoding efficiency comparison step S40205). If a filter with the least code quantity is the first filter, the encoding efficiency comparison unit 20205 outputs the identifier "1" to indicate the first filter and the filter coefficient of the first filter as the filter information 213 (first filter information output step S40206), and processing ends. If the selected filter is the second filter, the encoding efficiency comparison unit 20205 outputs the identifier "2" to indicate the second filter as the filter information 213 (second filter information output step S40207), and processing ends. If the selected filter is the third filter, the encoding efficiency comparison unit 20205 outputs the identifier "3" to indicate the third filter as the filter information 213 (third filter information output step S40208), and processing ends.

Figure 6:
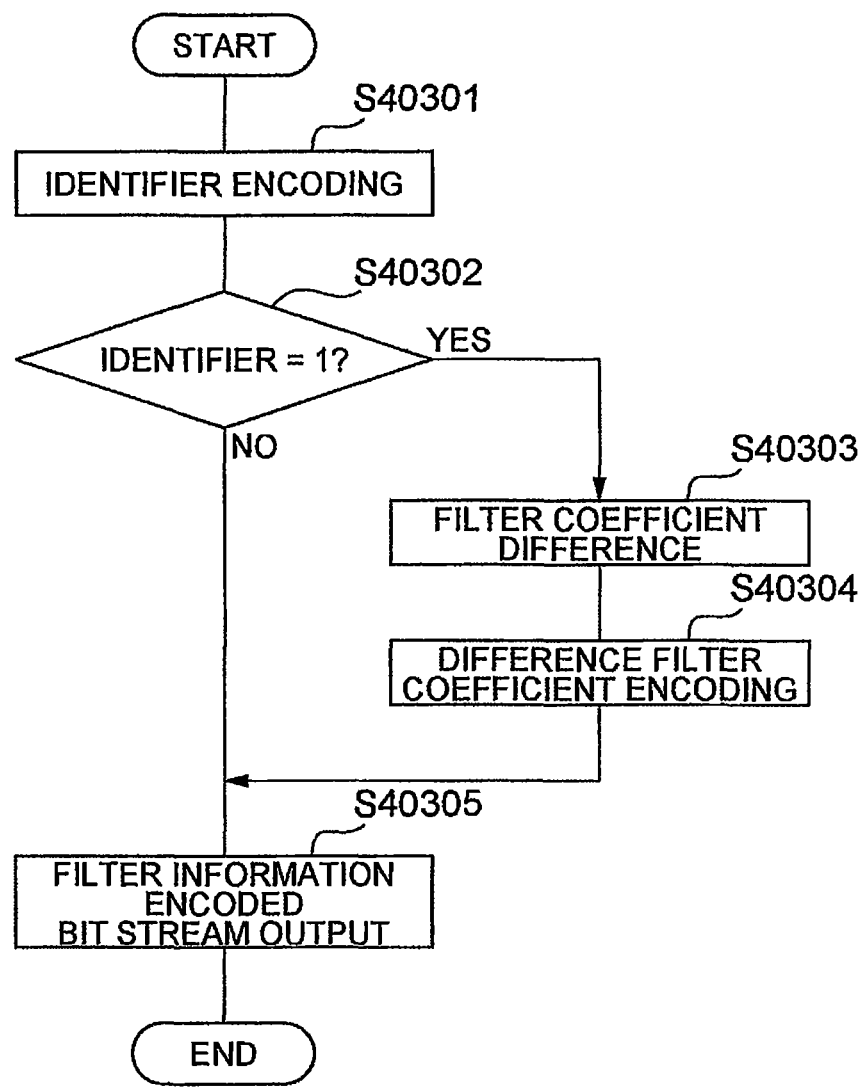
FIG. 6 is a flow chart depicting the filter information encoding step shown in FIG. 4.

Now the filter information encoding step S403 will be described in detail with reference to FIG. 6. FIG. 6 is a flow chart depicting the filter information encoding step S403, which is an operation of the filter information encoding unit 205.

The filter information encoding unit 205 encodes an identifier of the filter included in the filter information 213 (identifier encoding step S40301).

If the file identifier is "1" (step S40302: YES), the filter information encoding unit 205 calculates a difference value of each filter coefficient of the first filter from the corresponding filter coefficient of the previous frame filter information 212 (filter coefficient difference step S40303), and encodes the difference value (difference filter coefficient encoding step S40304). If the filter identifier is not "1" (step S40302: NO), processings of the filter coefficient difference step and difference filter coefficient encoding step are not executed.

The filter information encoding unit 205 outputs the filter information encoded bit stream 214, encoded as above (filter information encoded bit stream output step S40305), and processing ends.

Figure 7:
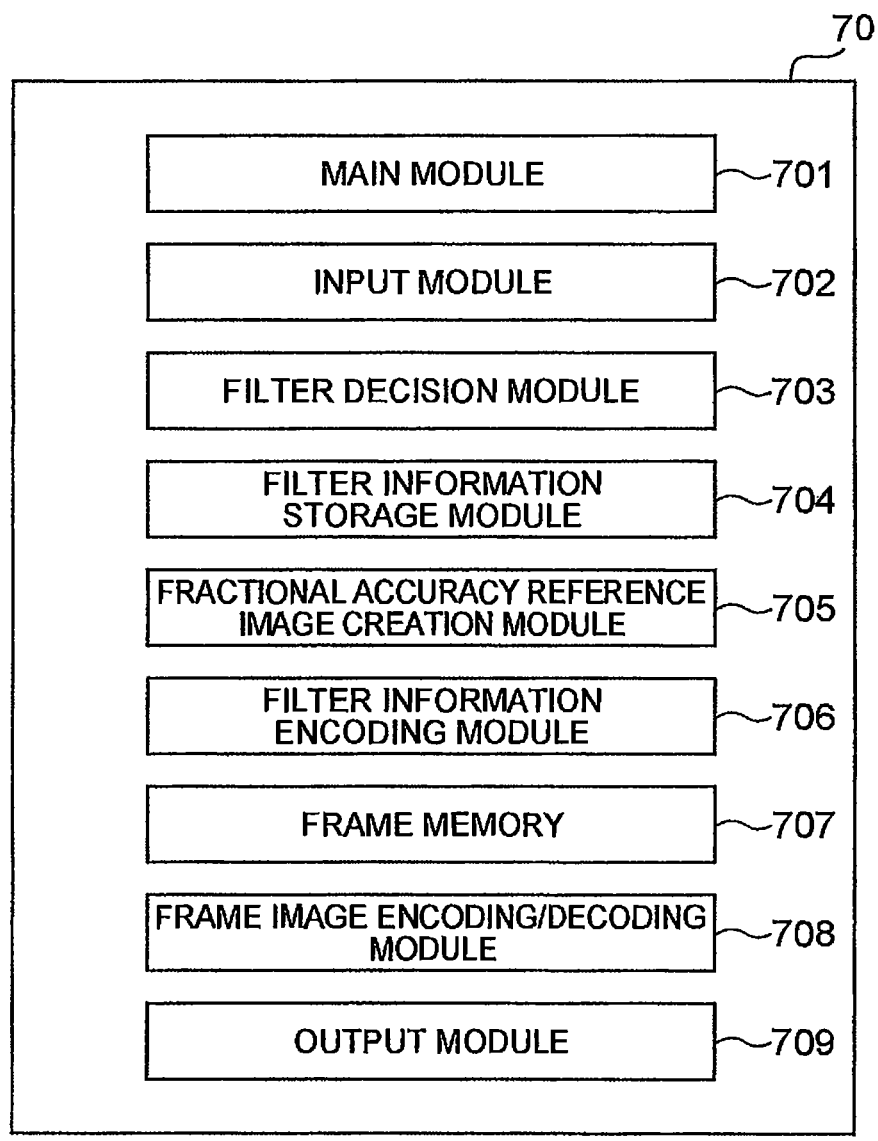
FIG. 7 is a diagram depicting a configuration of a video encoding program according to the first embodiment.

Now a video encoding program 70, for causing a computer to function as the above mentioned video encoding device 20, will be described. FIG. 7 is a diagram depicting a configuration of the video encoding program 70.

As FIG. 7 shows, the video encoding program 70 has a main module program 701 which performs general processing control, input module 702, filter decision module 703, filter information storage module 704, fractional accuracy reference image creation module 705, filter information encoding module 706, frame memory 707, frame image encoding/decoding module 708, and output module 709. The functions of the input module 702, filter decision module 703, filter information storage module 704, fractional accuracy reference image creation module 705, filter information encoding module 706, frame memory 707, frame image encoding/decoding module 708, and output module 709 executed by computer, are the same as the above mentioned input unit 201, filter decision unit 202, filter information storage unit 203, fractional accuracy reference image creation unit 204, filter information encoding unit 205, frame memory 206, frame image encoding/decoding unit 207, and output unit 208 respectively.

Figure 8:
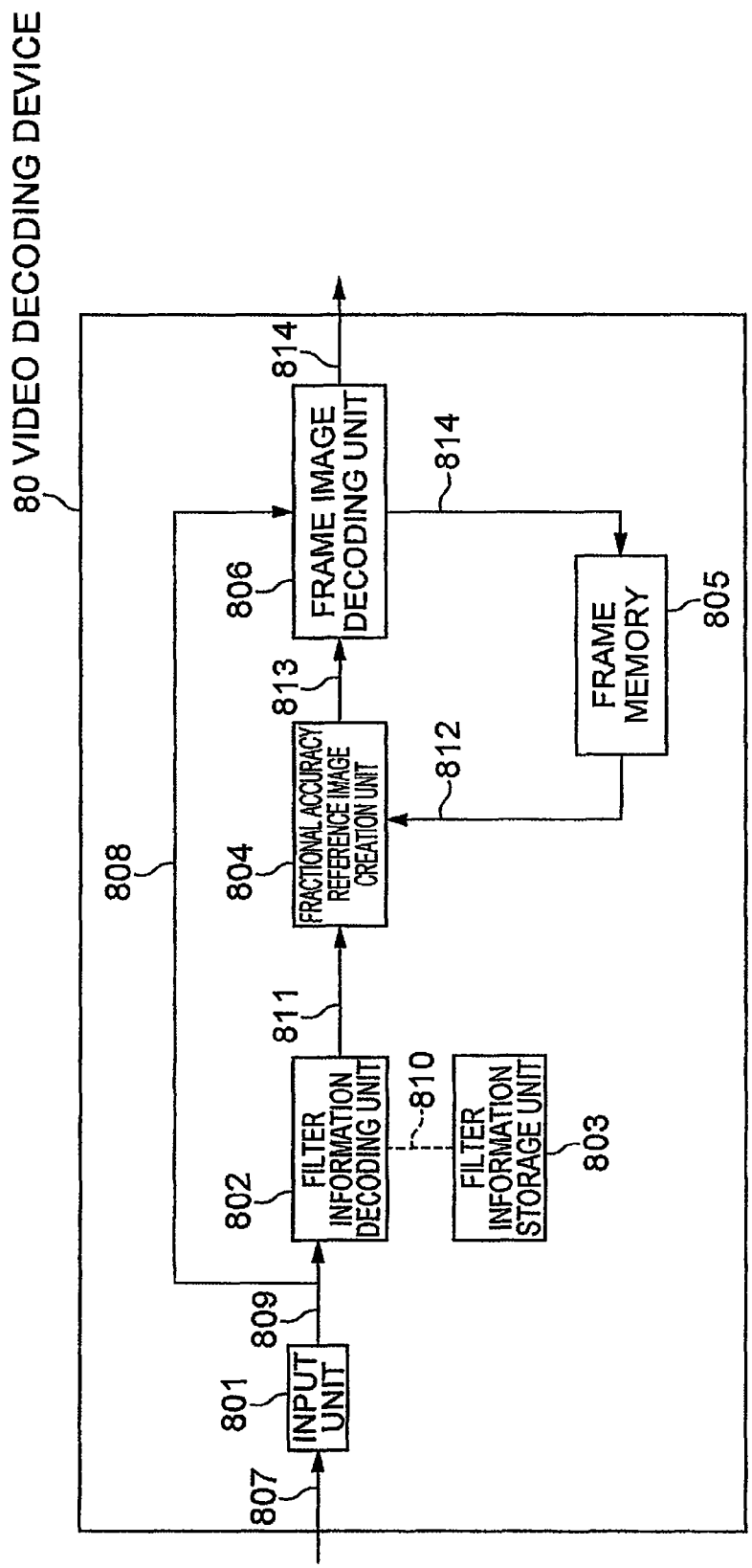
FIG. 8 is a block diagram depicting a configuration of a video decoding device according to the first embodiment.

FIG. 8 is a block diagram depicting a configuration of a video decoding device 80 according to the present embodiment. The video decoding device 80 has an input unit 801, filter information decoding unit (filter information decoding means) 802, filter information storage unit (filter information storage means) 803, fractional accuracy reference image creation unit 804, frame memory 805, and frame image decoding unit 806 as functional composing elements.

The input unit 801 separates an encoded bit stream 807, which was input from the outside, sequentially into a filter information encoded bit stream 809 and frame image encoded bit stream 808, in frame units. The input unit 801 outputs the filter information encoded bit stream 809 to the filter information decoding unit 802. The input unit 801 also outputs the frame image encoded bit stream 808 to the frame image decoding unit 806.

The filter information storage unit 803 holds a filter used for creating a reference image with functional accuracy when the frame image in the previous frame was decoded (previous frame filter information 810). The previous frame filter information 810 is referred to and updated by the filter information decoding unit 802.

The filter information decoding unit 802 decodes the filter information encoded bit stream 809 which was input from the input unit 801, and restores the filter information 811, while referring to the previous frame filter information 810 in the filter information storage unit 803, and outputs [the filter information 811] to the fractional accuracy reference image creation unit 804.

The frame memory 805 holds frame images which have already been decoded, and outputs these frame images to the fractional accuracy reference image creation unit 804 as the reference images 812.

The fractional accuracy reference image creation unit 804 creates a fractional accuracy reference image 813 using the filter information 811 which was input from the filter information decoding unit 802 and reference image 812 which was input from the frame memory 805, and outputs [the fractional accuracy reference image 813] to the frame image decoding unit 806.

The frame image decoding unit 806 compensates motion and decodes frame images, using the frame image encoded bit stream 808 which was input from the input unit 801 and fractional accuracy reference image 813 which was input from the fractional accuracy reference image creation unit 804. The frame image decoding unit 806 outputs the decoded frame image 814 to the frame memory 206, and to the outside.

Now the filter information decoding unit 802 will be described in detail. First the filter information decoding unit 802 decodes and restores a filter identifier from the filter information encoded bit stream 809, which was input from the input unit 801.

If the filter identifier is "1", the filter information decoding unit 802 restores each filter coefficient referring to the previous frame filter information 810 of the filter information storage unit 803. The filter information decoding unit 802 first decodes the difference value of each filter coefficient from the corresponding value in the previous frame filter information 810. Then the filter information decoding unit 802 restores the filter by adding the filter coefficient of the previous frame filter information 810 to each decoded value. If the filter coefficients of the previous frame filter 810 are (b1', b2', b3', b4', b5', b6') in the horizontal direction and (h1', h2', h3', h4', h5', h6') in the vertical direction, and the difference values of the filter coefficients decoded by the filter information decoding unit 802 are (b1-b1', b2-b2', b3-b3', b4-b4', b5-b5', b6-b6') in the horizontal direction and (h1-h1', h2-h2', h3-h3', h4-h4', h5-h5', h6-h6') in the vertical direction, then the filter coefficients of the restored filter become (b1, b2, b3, b4, b5, b6) in the horizontal direction and (h1, h2, h3, h4, h5, h6) in the vertical direction.

If the filter identifier is "2", the filter information decoding unit 802 restores (1, −5, 20, 20, −5, 1)/32, which are filter coefficients of the standard filter, for both the horizontal and vertical directions. If the filter identifier is "3", the filter information decoding unit 802 restores (b1', b2', b3', b4', b5', b6') in the horizontal direction and (h1', h2', h3', h4', h5', h6') in the vertical direction, which are filter coefficients of the previous frame filter information 810.

The filter information decoding unit 802 outputs the restored identifier and filter coefficients, which are the filter information 811, to the fractional accuracy reference image creation unit 804. The filter information decoding unit 802 also updates the previous frame filter information 810, in the filter information storage unit 803, to the restored filter coefficients.

Now the fractional accuracy reference image creation unit 804 will be described in detail. The fractional accuracy reference image creation unit 804 creates a fractional accuracy reference image 813 with ¼ pixel accuracy, using the reference image 812 which was input from the frame memory 805, and the filter information 811 which was input from the filter information decoding unit 802.

If the filter identifier included in the filter information 811 is "1", the fractional accuracy reference image creation unit 804 crates a fractional accuracy reference image 813 with ¼ pixel accuracy by the above Expressions (8) to (22), using the filter coefficients (b1, b2, b3, b4, b5, b6) and (h1, h2, h3, h4, h5, h6) included in the filter information 811.

If the filter identifier included in the filter information 811 is "2", the fractional accuracy reference image creation unit 804 creates a fractional accuracy reference image 813 with ¼ pixel accuracy by Expression (23) to (38) using (1, −5, 20, 20, −5, 1)/32 which is a standard filter included in the filter information 811 for both the horizontal and vertical directions.

If the filter identifier included in the filter information 811 is "3", the fractional accuracy reference image creation unit 804 creates a fractional accuracy reference image 813 with ¼ pixel accuracy by Expressions (39) to (53), using filter coefficients (b1', b2', b3', b4', b5', b6') and (h1', h2', h3', h4', h5', h6') included in the filter information 811. Then the fractional accuracy reference image creation unit 804 outputs the created fractional accuracy reference image 813 to the frame image decoding unit 806.

Figure 9:
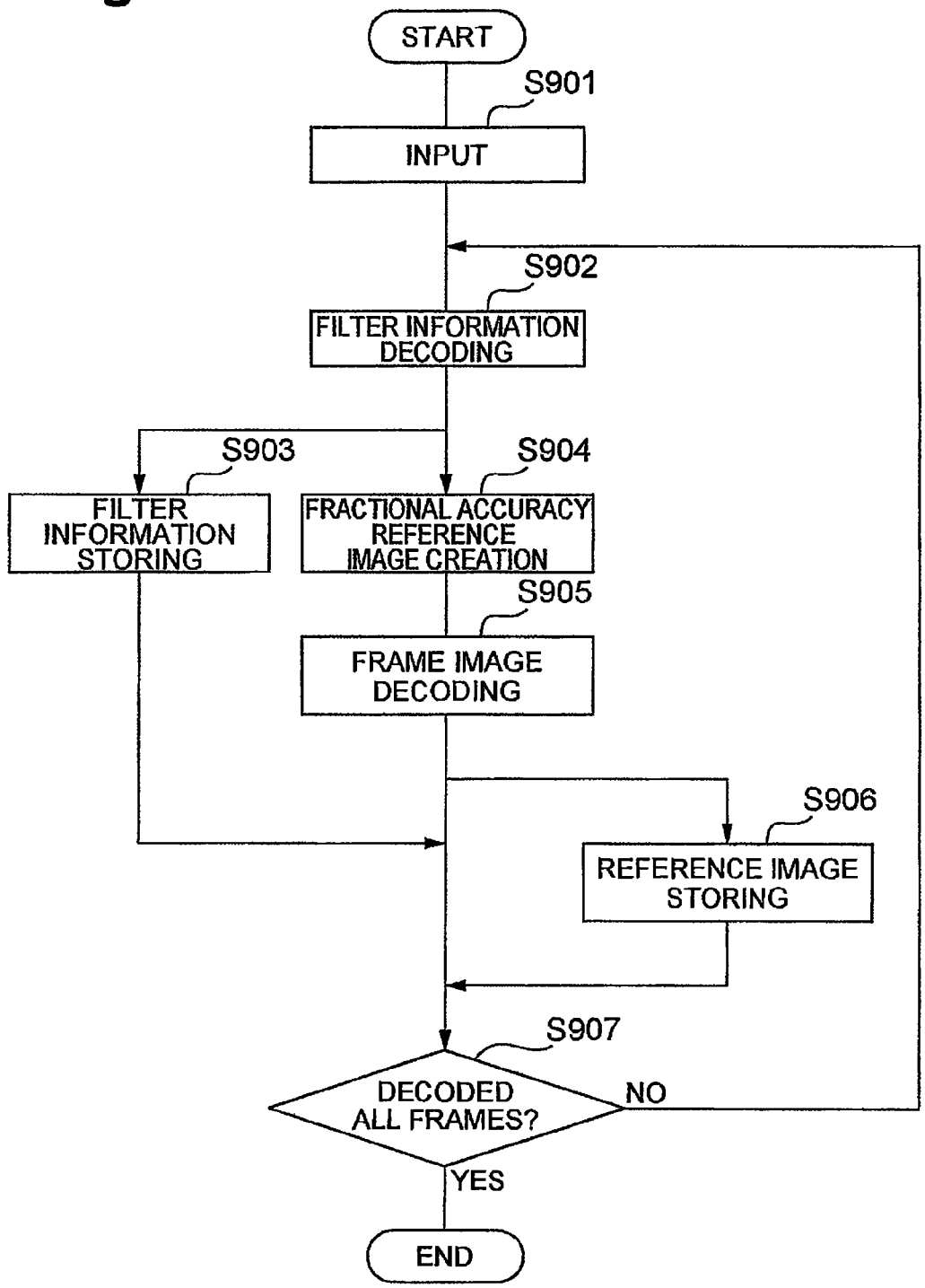
FIG. 9 is a flow chart depicting a video decoding method according to the first embodiment.

Now the operation of the video decoding method according to the present embodiment will be described with reference to FIG. 9. FIG. 9 is a flow chart depicting the video encoding method, which is an operation of the video decoding device 80 according to the present embodiment.

First the input unit 801 separates the encoded bit stream 807, which was input from the outside, into the filter information encoded bit stream 809 and frame image encoded bit stream 808 sequentially in frame units (input step S901).

Then the filter information decoding unit 802 decodes the filter information encoded bit stream 809 and restores the filter information 811 (filter information decoding step S902).

The filter information decoding unit 802 stores the filter information 811 in the filter information storage unit 803 as the previous frame filter information 810 (filter information storage step S903).

Meanwhile, the fractional accuracy reference image creation unit 804 creates a fractional accuracy reference image 813 using the filter information 811 and reference image 812 (fractional accuracy reference image creation step S904).

The frame image decoding unit 806 compensates motion and decodes the decoded frame image 814 using the frame image encoded bit stream 808 and fractional accuracy reference image 813 (frame image decoding step S905).

The frame image decoding unit 806 stores the decoded frame image 814 in the frame memory 805 (reference image storage step S906).

It is judged whether decoding of all the frame images completed (step S907), and if decoding of all the frame images completed (step S907: YES), processing ends. If decoding of all the frame images is not completed (step S907: NO), the previous frame filter information 810 and reference image 812 are updated, and processing is repeated from step S902.

Figure 10:
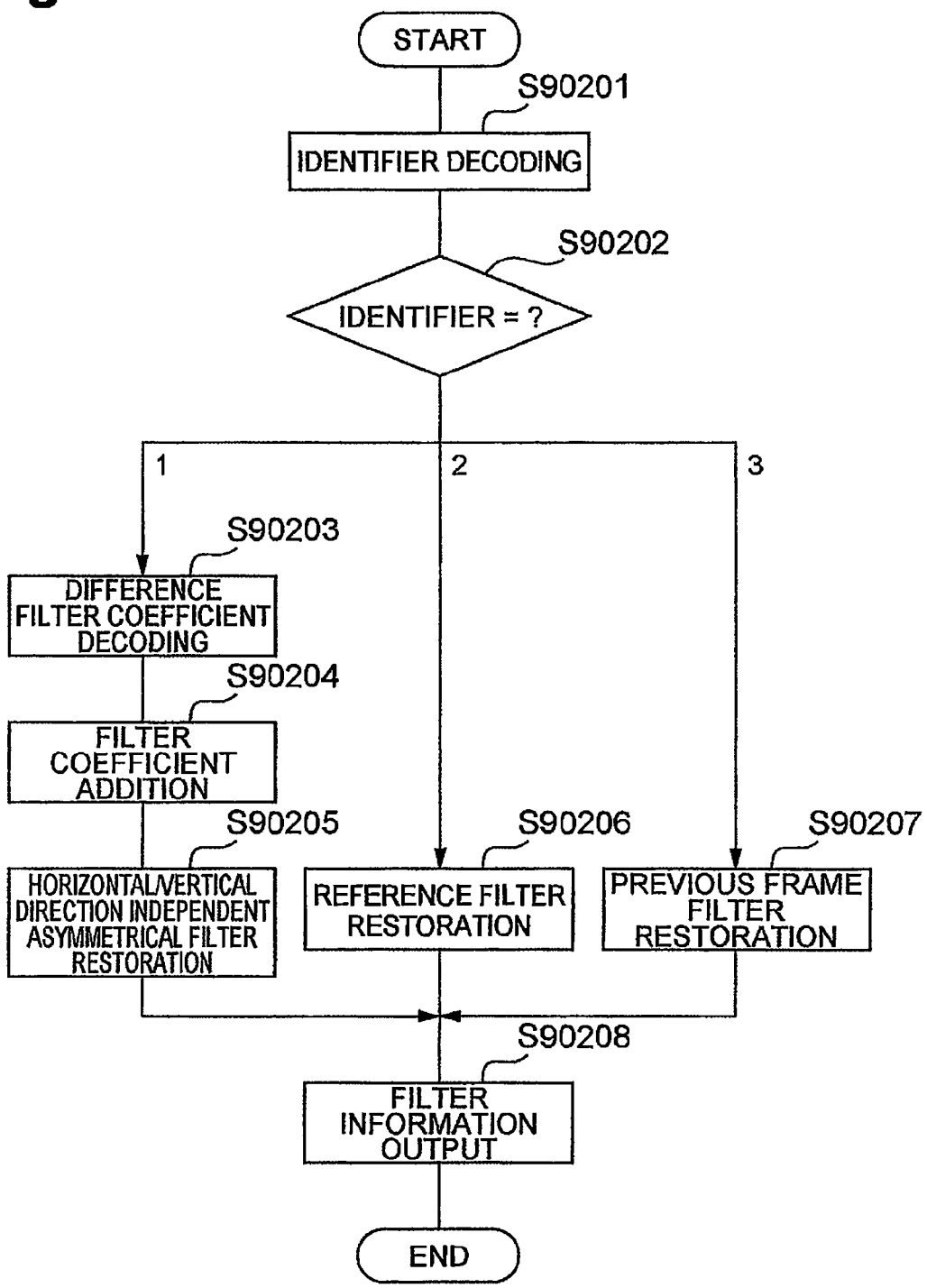
FIG. 10 is a flow chart depicting the filter information decoding step shown in FIG. 9.

Now the filter information decoding step S902 will be described in detail with reference to FIG. 10. FIG. 10 is a flow chart depicting the filter information decoding step S902, which is an operation of the filter information decoding unit 802.

First the filter information decoding unit 802 decodes and restores the filter identifier from the filter information encoded bit stream 809 (identifier decoding step S90201).

If the filter identifier is "1" (step S90202; 1), the filter information decoding unit 802 decodes a difference value of each filter coefficient from the corresponding value of the previous frame filter information 810 (difference filter coefficient decoding step S90203), adds the filter coefficients of the previous frame filter information 810 to each decoded value (filter coefficient addition step S90204), and restores an asymmetric filter which is independent in the horizontal and vertical directions (horizontal/vertical direction independent asymmetric filter restoration step S90205).

If the filter identifier is "2" (step S90202; 2), the filter information decoding unit 802 restores the filter coefficients of the standard filter (reference filter restoration step S90206).

If the filter identifier is "3" (step S90202; 3), the filter information decoding unit 802 restores the previous frame filter information 810 (previous frame filter restoration step S90207).

The filter information decoding unit 802 outputs the filter information 811 which is the restored identifier and the filter coefficients (filter information output step S90208), and processing ends.

Now a video decoding program 110 for causing a computer to function as the video decoding device 80 will be described. FIG. 1 is a diagram depicting the configuration of the video decoding program 110.

Figure 11:
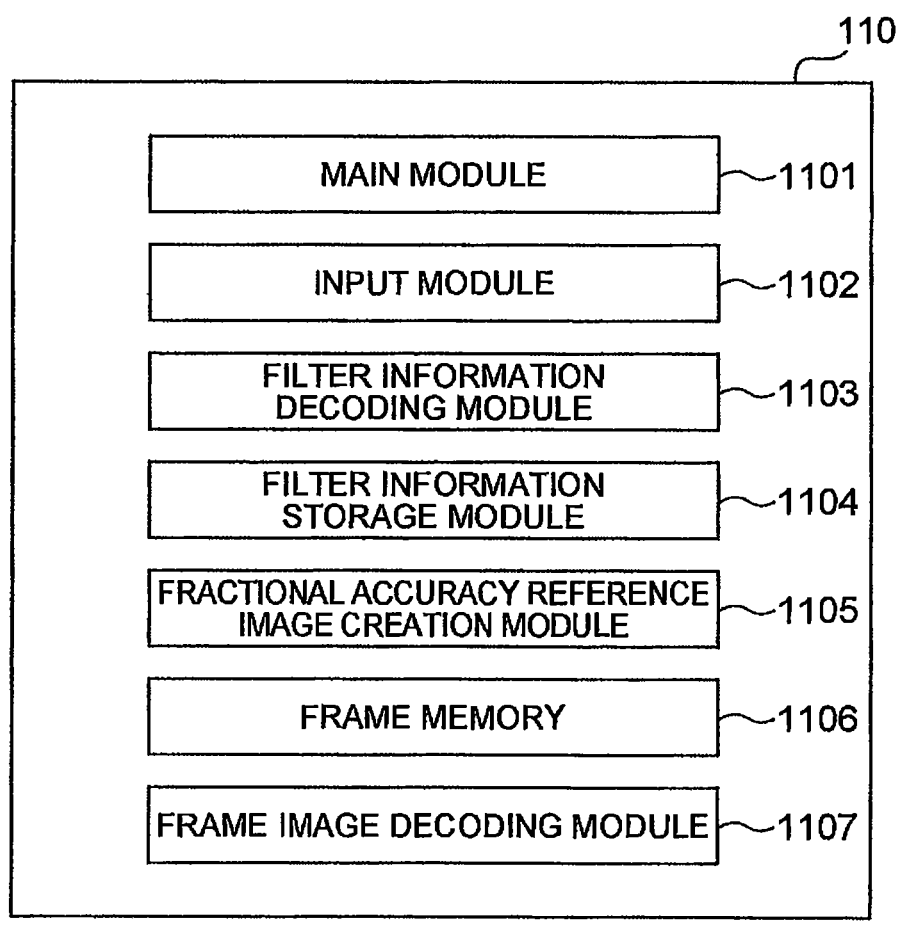
FIG. 11 is a diagram depicting a configuration of a video decoding program according to the first embodiment.

As FIG. 11 shows, the video decoding program 110 has a main module program 1101 which performs general processing control, input module 1102, filter information decoding module 1103, filter information storage module 1104, fractional accuracy reference image creation module 1105, frame memory 1106, and frame image decoding module 1107. Functions of the input module 1102, filter information decoding module 1103, filter information storage module 1104, fractional accuracy reference image creation module 1105, frame memory 1106 and frame image decoding module 1107, executed by a computer, are the same as the above mentioned input unit 801, filter information decoding unit 802, filter information storage unit 803, fractional accuracy reference image creation unit 804, frame memory 805, and frame image decoding unit 806 respectively.

According to the video encoding device, video encoding method and video encoding program of the present invention, when a reference image with a fractional pixel accuracy is generated and motion is compensated using a filter for each frame for encoding, a filter is selected and decided out of a plurality of filter candidates including at least the filter used for encoding of the frame image in the previous frame. Therefore it is sufficient to encode the identifier to indicate the filter used for encoding of the frame image in the previous frame, and unnecessary to encode the filter coefficients. As a result, code quantity of the filter coefficients can be decreased.

The filter candidates include the asymmetric filter, which is independent in the horizontal and vertical directions, so if an identifier to indicate this asymmetric filter, which is independent in the horizontal and vertical directions and the filter coefficients of the filter, are subtracted from the filter coefficients of the filter used for encoding of the frame image in the previous frame for encoding, motion can be compensated at high accuracy even for video images having different characteristics in the horizontal and vertical directions, with less code quantity of the filter coefficients. The code quantity of the filter coefficients can also be decreased merely by including the standard filter in the filter candidates and encoding the identifier to indicate the standard filter (without encoding the filter coefficients).

According to the video decoding device, video decoding method and video decoding program of the present invention, when a reference image with a fractional pixel accuracy is generated and motion is compensated using a filter for each frame for decoding, a filter is selected and decided out of a plurality of filter candidates including at least the filter used for decoding of the frame image in the previous frame. Therefore it is sufficient to decode the identifier to indicate the filter used for decoding of the frame image in the previous frame, and unnecessary to decode the filter coefficients. As a result, code quantity of the filter coefficients to be decoded can be decreased.

The filter candidates include an asymmetric filter, which is independent in the horizontal and vertical directions, so if an identifier to indicate this asymmetric filter, which is independent in the horizontal and vertical directions, and the filter coefficients of the filter, are subtracted from the filter coefficients of the filter used for decoding of the frame image in the previous frame for decoding, motion can be compensated at high accuracy even for video images having different characteristics in the horizontal and vertical directions, with less code quantity of the filter coefficients to be decoded. The code quantity of the filter coefficients to be decoded can also be decreased merely by including the standard filter in the filter candidates, and decoding the identifier to indicate the standard filter (without decoding the filter coefficients).

Second Embodiment

A variant form for creating a reference image with fractional accuracy using a different filter for each reference frame when encoding is performed using a plurality of reference frames (reference imagers) will now be described.

In the case of the above mentioned H.264 encoding system and the description disclosed in the above mentioned Non-patent Document 1 and Non-patent Document 2, even if a plurality of frames of reference images exist, a reference image with a fractional pixel accuracy is created using a same filter for all the reference images for each frame to be encoded. Therefore when frames to be encoded having motion quantities and frequency characteristics with different pixel accuracy with respect to each reference image, an appropriate filter for encoding cannot be used for encoding each reference image, and motion cannot be compensated at high accuracy. An object of the second embodiment is to implement motion compensation at high accuracy, even if frames to be encoded have motion quantity and frequency characteristics with different pixel accuracy with respect to each reference image.

The different components of the video en coding device of the second embodiment from the video encoding device 20 of the first embodiment are the filter decision unit 202, filter information storage unit 203, fractional accuracy reference image creation unit 204 and filter information encoding unit 205, so only these components will be described.

The filter decision unit 202, when a reference image is created using a different filter for each reference frame, will be described with reference to FIG. 3. The filter information storage unit 203 holds a filter used for creating a reference image with a fractional accuracy when the frame image in the previous frame is encoded (previous frame filter information 212) for each reference frame.

Figure 12:
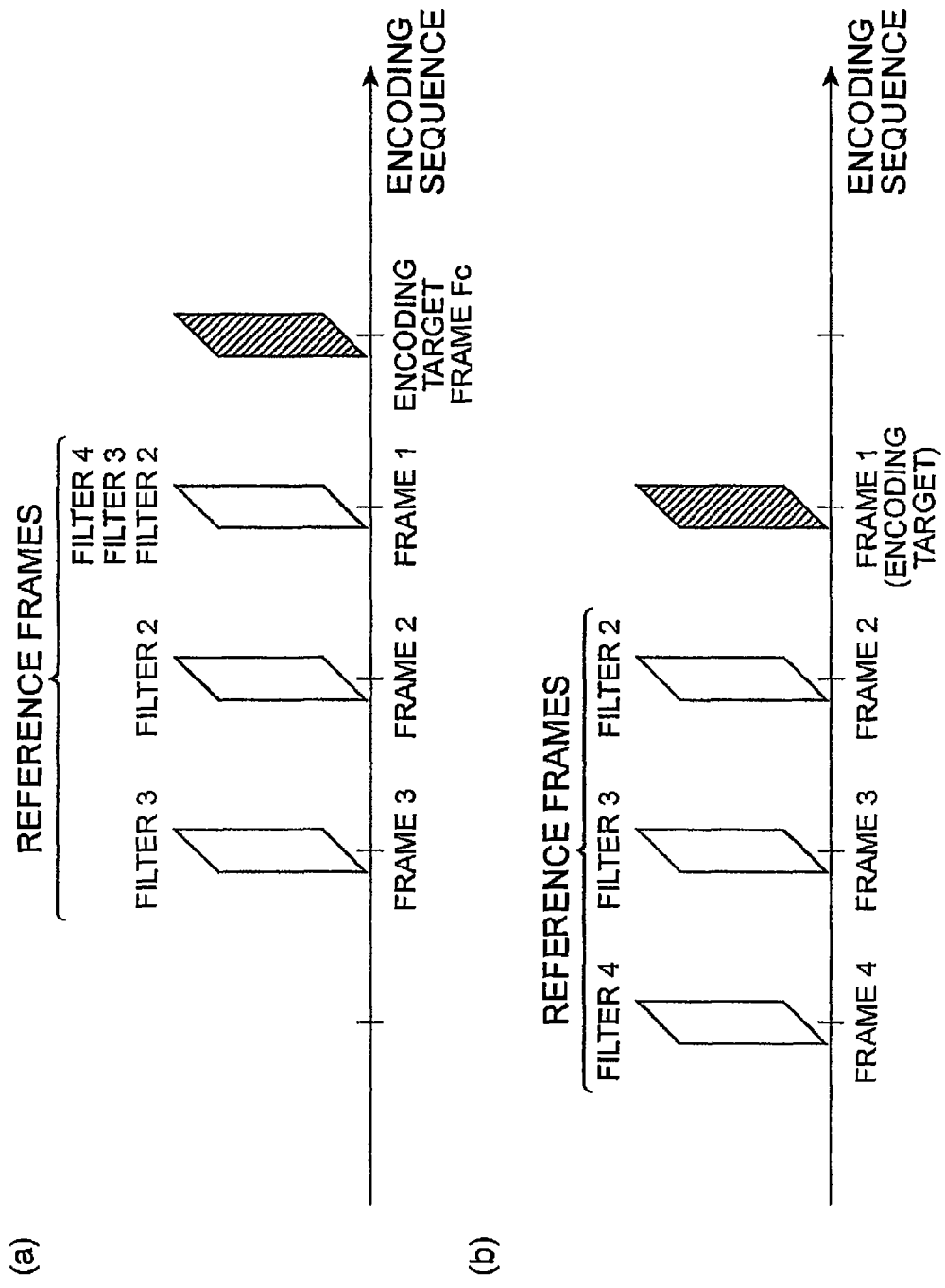
FIG. 12 is a diagram depicting an encoding sequence of encoding target frames and reference frames according to a second embodiment.

As FIG. 12 (a) shows, in a case when three frame, encoded as reference frames in the past, are used for a current encoding target frame Fc, the identifiers of these reference frames are assumed as reference frame 3, reference frame 2 and reference frame 1 in the encoding sequence. Also as FIG. 12 (b) shows, the identifiers of reference frames, when the reference frame 1 was encoded in the previous frame of the current encoding target frame Fc, are assumed to be reference frame 4, reference frame 3 and reference frame 2 in the encoding sequence.

The filters used for creating reference images with fractional accuracy for the reference frame 4, reference frame 3 and reference frame 2, when the reference frame 1 was encoded in the previous frame of the current encoding target frame Fc, are assumed to be filter 4, filter 3 and filter 2 respectively. When the current encoding target frame Fc is encoded based on this assumption, the filter information storage unit 203 holds the filter 3 for the reference frame 3, filter 2 for the reference frame 2, and filter 4, filter 3 and filter 2 for the reference frame 1, as the filters used for encoding the frame image in the previous frame.

The filter decision unit 202 uses the frame image 210 which was input from the input unit 201 and the reference image 211 which was input from the frame memory 206, decides the filter information 213 for creating a reference image with fractional accuracy for encoding the current encoding target frame image, with reference to the previous frame filter information 212 of the filter information storage unit 203. Then the filter decision unit 202 outputs the decided filter information 213 to the fractional accuracy reference image creation unit 204 and filter information encoding unit 205.

Specifically, the first filter coefficient decision unit 20201 in the filter decision unit 202 decides a first filter 20206 for creating a reference image with ½ pixel accuracy, which is asymmetric and independent in the horizontal and vertical directions, using the frame image 210 which was input from the input unit 201, and the reference frame 3 out of the reference image 211 which was input from the frame memory 206. Then the first filter coefficient decision unit 20201 outputs the decided first filter 20206, frame image 210, and reference frame 3 out of the reference image 211 to the first filter encoding efficiency calculation unit 20202.

Then the first filter encoding efficiency calculation unit 20202 generates a reference image with ¼ pixel accuracy from the reference frame 3 out of the reference image 211, using the first filter 20206 which were input from the first filter coefficient decision unit 20201, frame image 210 and the reference frame 3 out of the reference image 211 which was input from the frame memory 206. Then the first filter encoding efficiency calculation unit 20202 calculates the code quantity when the frame image 210 is encoded using the generated reference image. The first filter encoding efficiency calculation unit 20202 outputs the coefficients of the first filter and calculated code quantity S1 to the encoding efficiency comparison unit 20205 as the first filter information 20207.

Then the second filter encoding efficiency calculation unit 20203 generates a reference image with ¼ pixel accuracy from the reference frame 3 out of the reference image 211, using the frame image 210, the reference frame 3 out of the reference image 211 and the second filter which is a standard filter held in the second filter encoding efficiency calculation unit 20203 in advance. Then the second filter encoding efficiency calculation unit 20203 calculates the code quantity when the frame image 210 is encoded using the generated reference image. The second filter encoding efficiency calculation unit 20203 outputs the calculated code quantity S2 to the encoding efficiency comparison unit 20205 as the second filter information 20208.

Then the third filter encoding efficiency calculation unit 20204 generates a reference image with ¼ pixel accuracy from the reference frame 3 out of the reference image 211, referring to the filter 3 for the reference frame 3 out of the previous frame filter information 212 in the filter information storage unit 203. Then the third filter encoding efficiency calculation unit 20204 calculates the code quantity when the frame image 210 is encoded using the generated reference image. The third filter encoding efficiency calculation unit 20204 outputs the calculated code quantity S3 to the encoding efficiency comparison unit 20205 as the third filter information 20209.

Then the encoding efficiency comparison unit 20205 selects a filter with the least code quantity out of the three filters, using the first filter information 20207 which was input from the first filter encoding efficiency calculation unit 20202, the second filter information 20208 which was input from the second filter encoding efficiency calculation unit 20203, and the third filter information 20209 which was input from the third filter encoding efficiency calculation unit 20204. Then the encoding efficiency comparison unit 20205 outputs the filter information 213 of the selected filter to the fractional accuracy reference image creation unit 204 and the filter information encoding unit 205, as the filter information for the reference frame 3.

Specifically, the encoding efficiency comparison unit 20205 compares the code quantity S1, code quantity S2 and code quantity S3, and selects a filter with the least code quantity. If the code quantity of S1 is the least, the encoding efficiency comparison unit 20205 outputs the identifier "1", to indicate the first filter, and the coefficients of the first filter (b1, b2, b3, b4, b5, b6) and (h1, h2, h3, h4, h5, h6) to the fractional accuracy reference image creation unit 204 and filter information encoding unit 205 as the filter information 213 for the reference frame 3. If the code quantity of S2 is the least, the encoding efficiency comparison unit 20205 outputs the identifier "2", to indicate the second filter, to the fractional accuracy reference image creation unit 204 and the filter information encoding unit 205 as the filter information 213 for the reference frame 3. If the code quantity of S3 is the least, the encoding efficiency comparison unit 20205 outputs the identifier "3", to indicate the third filter, to the fractional accuracy reference image creation unit 204 and filter information encoding unit 205 as the filter information 213 for the reference frame 3.

In the same manner, the filter decision unit 202 uses the frame image 210 which was input from the input unit 201 and the reference frame 2 out of the reference image 211 which was input from the frame memory 206, and selects a filter with the least code quantity when encoded in the first filter, second filter and third filter of filter 2, with reference to the filter 2 in the previous frame filter information 212 of the filter information storage unit 203. Then the filter decision unit 202 outputs the filter information 213 of the selected filter to the fractional accuracy reference image creation unit 204 and the filter information encoding unit 205 as the filter information for the reference frame 2.

Specifically, the encoding efficiency comparison unit 20205 in the filter decision unit 202 compares the code quantity S1 when encoding is performed using the first filter, the code quantity S2 when encoding is performed using the second filter, and the code quantity S3 when encoding is performed using the third filter, and selects a filter with the least code quantity.

If the code quantity of S1 is the least, the encoding efficiency comparison unit 20205 outputs the identifier "1", to indicate the first filter, and the coefficients of the first filter (b1, b2, b3, b4, b5, b6) and (h1, h2, h3, h4, h5 h6) to the fractional accuracy reference image creation unit 204 and the filter information encoding unit 205 as the filter information 213 for the reference frame 2. If the code quantity of S2 is the least, the encoding efficiency comparison unit 20205 outputs the identifier "2", to indicate the second filter, to the fractional accuracy reference image creation unit 204 and the filter information encoding unit 205 as the filter information 213 for the reference frame 2. If the code quantity of S3 is the least, the encoding efficiency comparison unit 20205 outputs the identifier "3", to indicate the third filter, to the fractional accuracy reference image creation unit 204 and the filter information encoding unit 205 as the filter information 213 for the reference frame 2.

The filter decision unit 202 also uses the frame image 210 which was input from the input unit 201, and the reference frame 1 out of the reference image 211 which was input from the frame memory 206, and selects a filter with the least code quantity when encoded out of the first filter, second filter and third filter of filter 4, filter 3 or filter 2, with reference to filter 4, filter 3 and filter 2 for the reference frame 1, out of the previous frame filter information 212 of the filter information storage 203. Then the filter decision unit 202 outputs the selected filter information 213 to the fractional accuracy reference image creation unit 204 and the filter information encoding unit 205 as the filter information for the reference frame 2.

If encoding is performed using the third filter at this time, the filter decision unit 202 calculates an identifier to indicate the filter which was used, filter 4, filter 3 or filter 2, including the code quantity which was encoded. If a filter which requires the least code quantity for encoding is the third filter, the filter decision unit 202 includes the information to indicate the filter which was used, filter 4, filter 3 or filter 2, in the filter information 213, and outputs [this filter information 213].

Specifically, the encoding efficiency comparison unit 20205 in the filter decision unit 202 compares the code quantity S1 when encoding is performed using the first filter, the code quantity S2 when encoding is performed using the second filter, and the code quantity S3 when encoding is performed using the third filter, and selects a filter with the least code quantity.

If the code quantity of S1 is the least, the encoding efficiency comparison unit 20205 outputs the identifier "1", to indicate the first filter, and the coefficients of the first filter (b1, b2, b3, b4, b5, b6) and (h1, h2, h3, h4, h5 h6) to the fractional accuracy reference image creation unit 204 and the filter information encoding unit 205 as the filter information 213 for the reference frame 1.

If the code quantity of S2 is the least, the encoding efficiency comparison unit 20205 outputs the identifier "2", to indicate the second filter, to the fractional accuracy reference image creation unit 204 and the filter information encoding unit 205 as the filter information 213 for the reference frame 1.

If the code quantity of S3 is the least, the encoding efficiency comparison unit 20205 outputs the identifier "3", to indicate the third filter, and the identifier of the filter type ("1" if the used filter is filter 4, "2" if the used filter is filter 3, and "3" if the used filter is filter 2), to the fractional accuracy reference image creation unit 204 and the filter information encoding unit 205 as the filter information 213 for the reference frame 1.

The fractional accuracy reference image creation unit 204 creates a fractional accuracy reference image 215 for each reference frame, using the filter information 213 for each reference frame which was input from the filter decision unit 202, and the reference image 211 which was input from the frame memory 206. Then the fractional accuracy reference image creation unit 204 outputs the created fractional accuracy reference image 215 to the frame image encoding/decoding unit 207.

First the processing of the fractional accuracy reference image creation unit 204 for a reference frame, other than the reference frame encoded in the previous frame, will be described in concrete terms. If the filter identifier included in the filter information 213 is "1", the fractional accuracy reference image creation unit 204 creates the fractional accuracy reference image 215 with ¼ pixel accuracy, using the filter coefficients included in the filter information 213.

If the filter identifier included in the filter information 213 is "2", the fractional accuracy reference image creation unit 204 creates the fractional accuracy reference image 215 with ¼ pixel accuracy using the standard filter for both horizontal and vertical directions.

If the filter identifier included in the filter information 213 is "3", the fractional accuracy reference image creation unit 204 creates the fractional accuracy reference image 215 with ¼ pixel accuracy using the previous frame filter information 212 for each reference frame, with reference to the filter information storage unit 203.

Now the processing of the fractional accuracy reference image creation unit 204 for the reference frame encoded in the previous frame will be described. If the filter identifier included in the filter information 213 is "1", the fractional accuracy reference image creation unit 204 creates the fractional accuracy reference image 215 with ¼ pixel accuracy using the filter coefficients included in the filter information 213.

If the filter identifier included in the filter information 213 is "2", the fractional accuracy reference image creation unit 204 creates the fractional accuracy reference image 215 with ¼ pixel accuracy using the standard filter for both horizontal and vertical directions.

If the filter identifier included in the filter information 213 is "3", the fractional accuracy reference image creation unit 204 creates the fractional accuracy reference image 215 with ¼ pixel accuracy using the previous frame filter information 212 of a filter in the filter type of this reference frame, stored in the filter information storage unit 203, with reference to the identifier of the used file type ("1" in the case of filter 4, "2" in the case of filter 3, and "3" in the case of filter 2), included in the filter information 213.

The filter information encoding unit 205 encodes the filter identifier included in the filter information 213 for each reference frame which was input from the filter decision unit 202. If the filter identifier is "1", the filter information encoding unit 205 encodes the filter coefficients of the first filter (b1, b2, b3, b4, b5, b6) and (h1, h2, h3, h4, h5, h6) included in the filter information 213.

At this time, if the currently encoding filter information encoded bit stream 214 is not of the reference frame encoded in the previous frame, the filter information encoding unit 205 refers to the previous frame information 212 of this reference frame of the filter information storage unit 203, and encodes a difference value of each filter coefficient from the corresponding filter coefficient of the previous frame filter information 212 respectively.

In other words, if the filter coefficients of the previous frame filter information 212 are (b1', b2', b3', b4', b5', b6') for the horizontal direction and (h1', h2', h3', h4', h5', h6') for the vertical direction, the filter information encoding unit 205 encodes the filter coefficients (b1-b1', b2-b2', b3-b3', b4-b4', b5-b5', b6-b6') for the horizontal direction and (h1-h1', h2-h2', h3-h3', h4-h4', h5-h5', h6-h6') for the vertical direction.

If the currently encoding filter information encoded bit stream 214 is of the reference frame encoded in the previous frame, the filter information encoding unit 205 encodes the difference of each filter coefficient from the corresponding filter coefficient of the second filter (standard filter) respectively. Then the filter information encoding unit 205 outputs the encoded filter identifier and difference value of the filter coefficients to the output unit 208 as the filter information encoded bit stream 214.

If the filter identifier is "1", the filter information encoding unit 205 updates the previous frame filter information 212 of the reference frame of the filter information storage unit 203 to the first filter. If the filter identifier is "2", the filter information encoding unit 205 outputs the encoded filter identifier to the output unit 208 as the filter information encoded bit stream 214, and updates the previous frame filter information 212 of the filter information storage unit 203 to the second filter (standard filter).

Now the case of filter identifier "3" will be described. If the currently encoding filter information encoded bit stream 214 is not of the reference frame encoded in the previous frame, the filter information encoding unit 205 outputs the encoded filter identifier to the output unit 208 as the filter information encoded bit stream 214. Then the filter information encoding unit 205 updates the previous frame filter information 212 of this reference frame of the filter information storage unit 203 to the third filter, which is filter information the same as before the update.

If the currently encoding filter information encoded bit stream 214 is of the reference frame encoded in the previous frame, the filter information encoding unit 205 encodes the filter type of the filter used for creating the fractional accuracy reference image of the reference frame included in the filter information 213. Then the filter information encoding unit 205 combines [the filter type] with the encoded filter identifier, and outputs it to the output unit 208 as the filter information encoded bit stream 214. The filter information encoding unit 205 updates the previous frame filter information 212 of this reference frame of the filter information storage unit 203 to the filter used for creating the fractional accuracy reference image of this reference frame. Also the filter information encoding unit 205 sets the previous frame filter information of the frame to be the reference frame in the encoding of the next frame as the previous frame filter information 212 of the encoding target frame image of the filter information storage unit 203, corresponding with the reference frame.

Now the video encoding method according to the second embodiment will be described. Differences of the video encoding method of the second embodiment from the video encoding method of the first embodiment are the filter decision step S402, filter information encoding step S403, filter information storage step S404 and fractional accuracy reference image creation step S405, so only these steps will be described.

Figure 13:
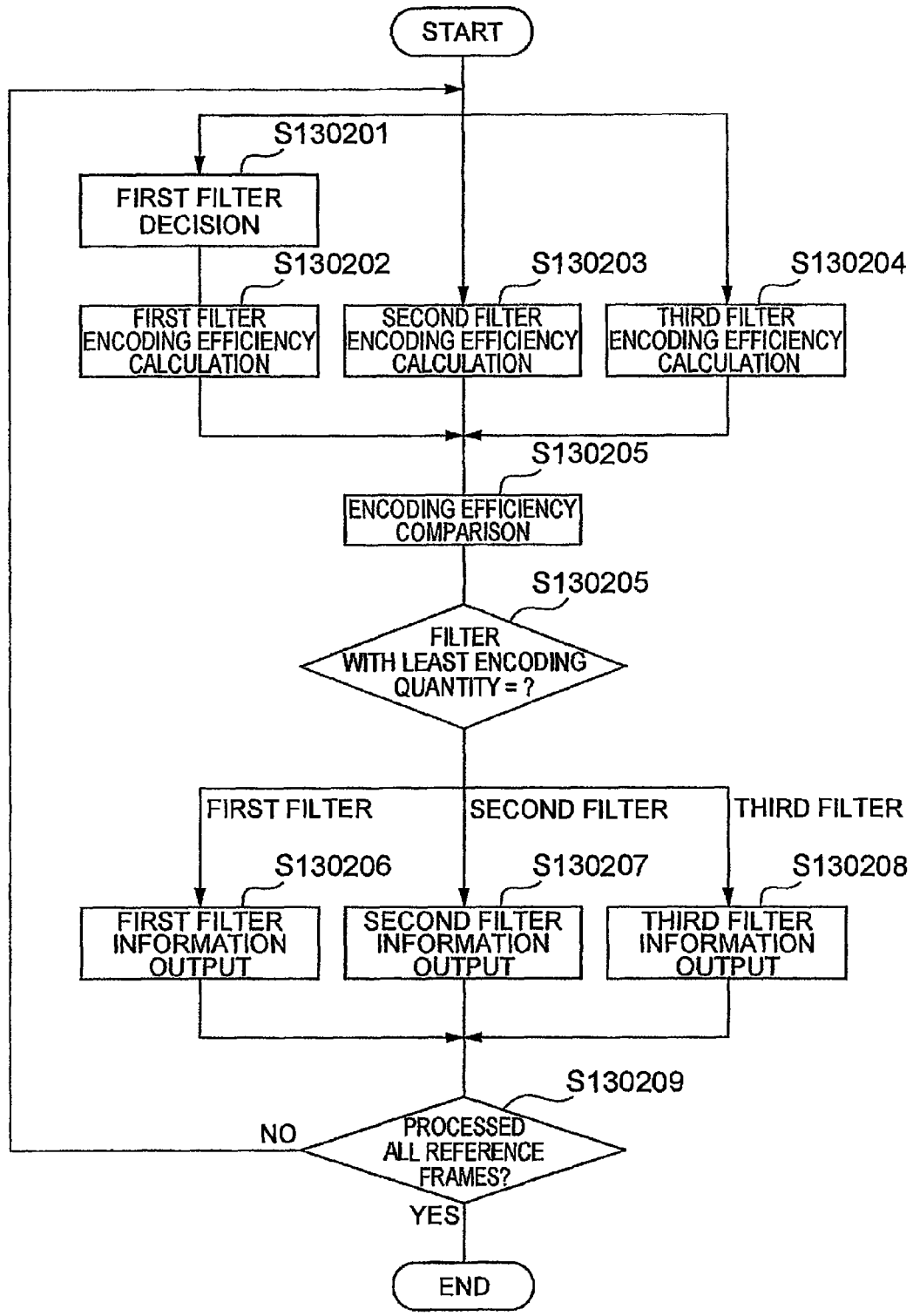
FIG. 13 is a flow chart depicting a filter decision step according to the second embodiment.

The filter decision step S1302, which is a variant form of the filter decision step S402, will be described with reference to FIG. 13. FIG. 13 is a flow chart depicting the filter decision step S1302, which is the operation of the filter decision unit 202 according to the second embodiment.

First the first filter coefficient decision unit 20201 decides a first filter 20206 for creating a reference image with ½ pixel accuracy, which is asymmetric and independent in the horizontal and vertical directions using the frame image 210 and the oldest reference frame of the reference image 211 in the encoding sequence (first filter decision step S130201).

Then the first filter encoding efficiency calculation unit 20202 uses the first filter 20206 and reference image 211 so as to generate a reference image with ¼ pixel accuracy from the reference image 211 by the first filter. The first filter encoding efficiency calculation unit 20202 calculates the code quantity S1 when the frame image 210 is encoded using the generated reference image (first filter encoding efficiency calculation step S130202).

The second filter encoding efficiency calculation unit 20203 uses the frame image 210, the oldest reference frame of the reference image 211 in the encoding sequence, and the second filter, which is a standard filter held in the second filter encoding efficiency calculation unit 20203 in advance so as to generate a reference image with ¼ pixel accuracy from the oldest reference frame of the reference image 211 in the encoding sequence. Then the second filter encoding efficiency calculation unit 20203 calculates the code quantity S2 when the frame image 210 is encoded using the generated reference image (second filter encoding efficiency calculation step S130203).

The third filter encoding efficiency calculation unit 20204 generates a reference image with ¼ pixel accuracy from the reference image 211, using the third filter, which is a filter for creating the reference image with ½ pixel accuracy used for encoding the frame image in the previous frame. Then the third filter encoding efficiency calculation unit 20204 calculates the code quantity S3 when the frame image 210 is encoded using the generated reference image. If a plurality of filter candidates exist as the third filter, the third filter encoding efficiency calculation unit 20204 calculates a code quantity when each filter is used, and regards the code quantity with the least code value as code quantity S3 (third filter encoding efficiency calculation step S130204).

Then the encoding efficiency comparison unit 20205 compares the code quantity S1, code quantity S2 and code quantity S3 (encoding efficiency comparison step S130205). If the filter with the least code quantity is the first filter, the encoding efficiency comparison unit 20205 outputs the identifier "1" to indicate the first filter and the filter coefficients of the first filter as the filter information 213 (first filter information output step S130206). If the selected filter is the second filter, the encoding efficiency comparison unit 20205 outputs the identifier "2" to indicate the second filter as the filter information 213 (second filter information output step S130207).

If the selected filter is the third filter, the encoding efficiency comparison unit 20205 outputs the identifier "3" to indicate the third filter as the filter information 213. If a plurality of filter candidates exist as the third filter, the encoding efficiency comparison unit 20205 also output an identifier of a filter type of the filter with the least code quantity as the filter information 213 (third filter information output step S130208).

Then the filter decision unit 202 judges whether processing for all the reference frames out of the reference image 211 is completed. If processing for all the reference frames is not completed (step S130209: NO), the processings in the above steps S130201 to S130208 are repeatedly executed for a second oldest reference frame in the encoding sequence. If the processing for all the reference frames is completed (step S130209: YES), processing ends.

Figure 14:
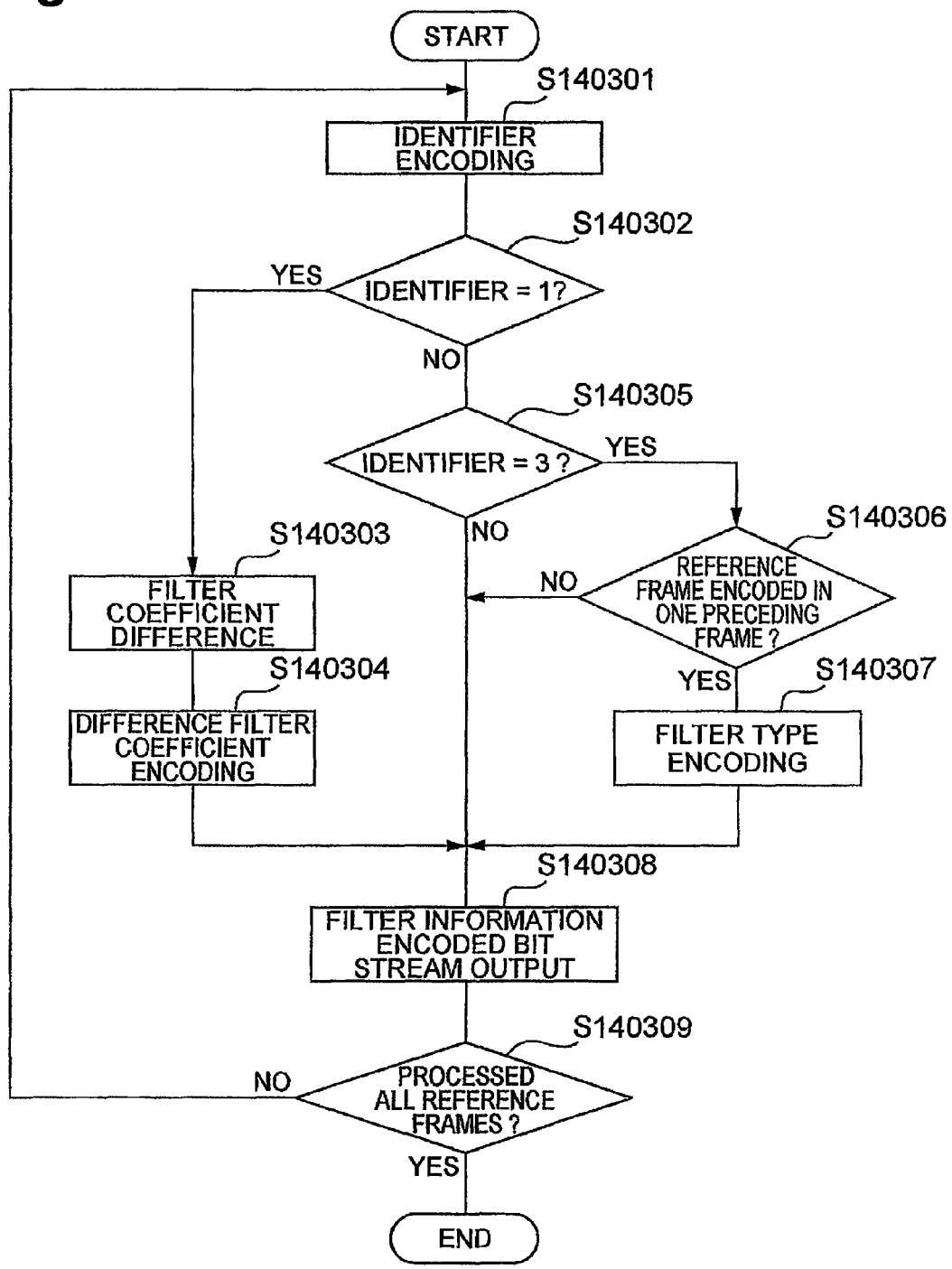
FIG. 14 is a filter information encoding step according to the second embodiment.

Now the filter information encoding step S1403 will be described in detail with reference to FIG. 14. FIG. 14 is a flow chart depicting the filter information encoding step S1403, which is an operation of the filter information encoding unit 205 according to the second embodiment.

First the filter information encoding unit 205 encodes an identifier of a filter included in the filter information 213 for the oldest reference frame in the encoding sequence (identifier encoding step S140301).

If the filter identifier is "1" (step S140302: YES), the filter information encoding unit 205 calculates the difference value of each filter coefficient of the first filter (filter coefficient difference step S40303), and encodes the difference values (difference filter coefficient encoding step S40304).

At this time, if the reference frame of which the filter information is currently being encoded is not the reference frame encoded in the previous frame, the difference value of the filter coefficient becomes a difference between each filter coefficient of the first filter and the corresponding filter coefficient of the previous frame filter information 212. If the reference frame of which filter information is currently being encoded is the reference frame encoded in the previous frame, the difference value of the filter coefficient becomes a difference between each filter coefficient of the first filter and the corresponding filter coefficient of the standard filter.

If the filter identifier of the reference frame is not "1" (step S40302: NO), these processings in the filter coefficient difference step and difference filter coefficient encoding step are not executed.

If the filter identifier is "3" (step S140305: YES), the filter information encoding unit 205 judges whether the reference frame of which filter information is currently being encoded is the reference frame encoded in the previous frame (step S140306). If the reference frame being encoded is the reference frame encoded in the previous frame (step S140306: YES), the filter information encoding unit 205 encodes the identifier of the filter type (filter type encoding step S140307). If the reference frame being encoded is not the reference frame encoded in the previous step (step S140306: NO), the processing in the filter type encoding step is not executed. If the filter identifier is not "3" (step S140305: NO) as well, the processing in the filter type encoding step is not executed.

Then the filter information encoding unit 205 outputs the encoded filter information encoded bit stream 214 (filter information encoded bit stream output step S140305).

Then the filter information encoding unit 205 judges whether processing for all the reference frames is completed. If processing for all the reference frames is not completed (step S140308: NO), the processings in the steps S140301 to S140308 are repeatedly executed for a second oldest reference frame in the encoding sequence. If the processing for all the reference frames is completed (step S140308: YES), processing ends.

A difference of the filter information storage step S11404, which is an operation of the filter information storage unit 203 according to the second embodiment, from the filter information storage step S404, is that the previous frame filter information 212 is stored for each reference frame to be used as the reference image.

A difference of the fractional accuracy reference image creation step S1405, which is an operation of the fractional accuracy reference image creation unit 204 according to the second embodiment from the fractional accuracy reference image creation step S405, is that the fractional accuracy reference image 215 is created using a different filter information 213 for each reference frame to be used as the reference image.

Different composing elements of the video decoding unit according to the second embodiment from the video decoding unit 80 of the first embodiment are the filter information decoding unit 802, filter information storage unit 803, and fractional accuracy reference image creation unit 804, so only these composing elements will be described.

The filter information storage unit 803 holds a filter which was used for creating the reference image with the fractional accuracy when the frame image in the previous frame is decoded (previous frame filter information 810) for each reference frame. The previous frame filter information 810 is referred to and is updated by the filter information decoding unit 802.

Figure 15:
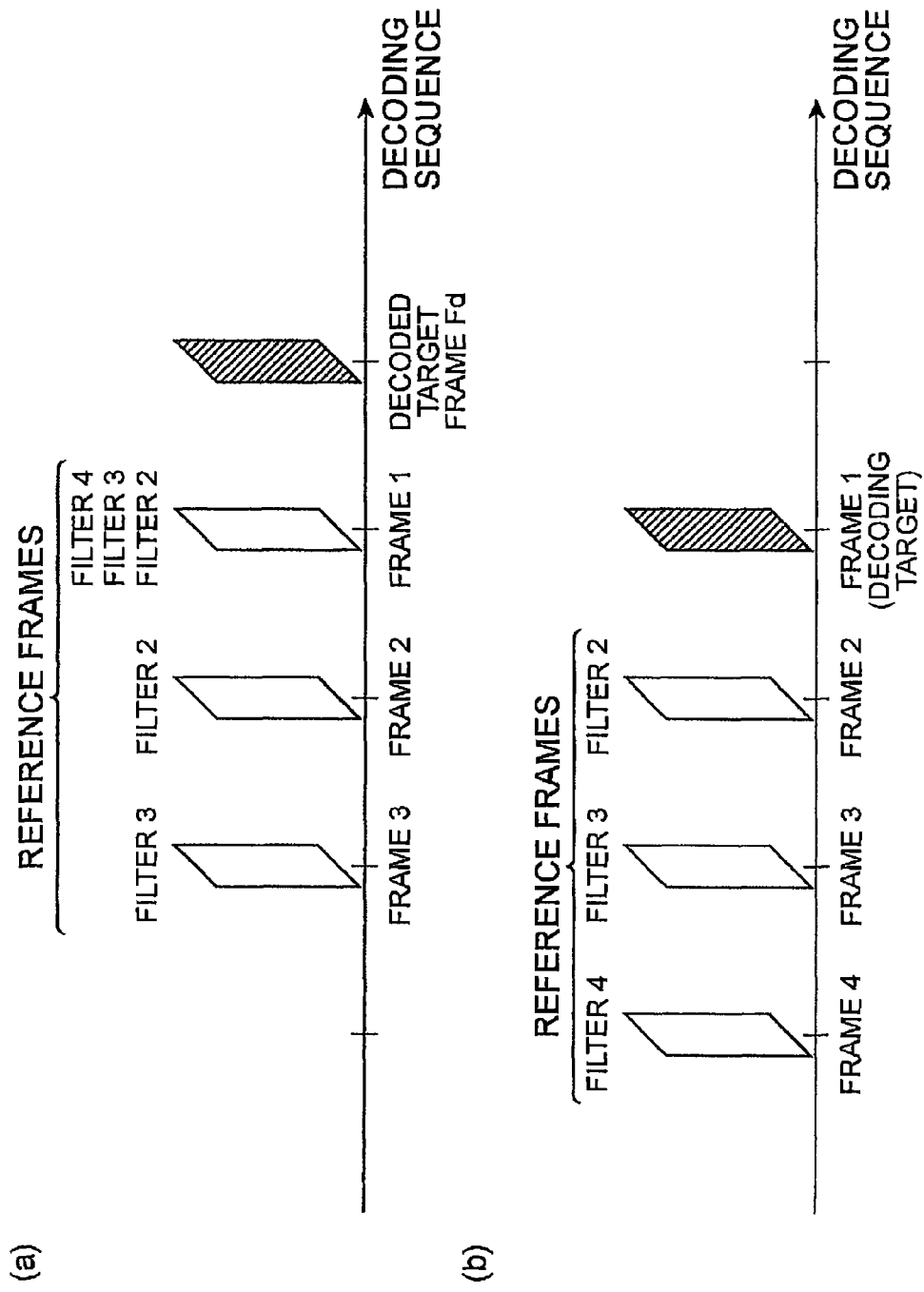
FIG. 15 is a diagram depicting a decoding sequence of decoding target frames and reference frames according to the second embodiment.

As FIG. 15 (a) shows, in a case when three frames which were decoded in the past as reference frames, are used for the current decoding target frame Fd, the identifiers of these reference frames are assumed as reference frame 3, reference frame 2 and reference frame 1 in the decoding sequence. Also as FIG. 15 (b) shows, the identifiers of reference frames, when the reference frame 1 decoded in the previous frame of the current decoding target frame Fd, are assumed to be reference frame 4, reference frame 3 and reference frame 2 in the decoding sequence.

The filters used for creating reference images with fractional accuracy for the reference frame 4, reference frame 3 and reference frame 2, when the reference frame 1, which was encoded in the previous frame of the current decoding target frame Fd, is decoded, are assumed to be filter 4, filter 3 and filter 2 respectively. When the current decoding target frame Fd is decoded, the filter information storage unit 803 holds the filter 3 for the reference frame 3, filter 2 for the reference frame 2, and filter 4, filter 3 and filter 2 for the reference frame 1, as filters used for decoding the frame image in the previous frame.

The filter information decoding unit 802 refers to the previous frame filter information 810 in the filter information storage unit 803, and decodes the filter information encoded bit stream 809 which was input from the input unit 801 to restore the filter information 811. Then the filter information decoding unit 802 outputs the restored filter information 811 to the fractional accuracy reference image creation unit 804.

Specifically, the filter information decoding unit 802 decodes and restores the filter identifier from the filter information encoded bit stream 809 which was input from the input unit 801 for each reference frame. The filter information decoding unit 802 sequentially executes this restoration from the older reference frame in the decoding sequence.

If the filter identifier is "1", the filter information decoding unit 802 restores each filter coefficient. First the filter information decoding unit 802 decodes the difference value of each filter coefficient. If the currently decoding filter information 811 is not of the reference frame decoded in the previous frame, the filter information decoding unit 802 refers to the previous frame filter information 810 of the filter information storage unit 803, and adds the corresponding filter coefficient of the previous frame filter information 810 to each decoded value of the filter coefficients, to restore the filter.

For example, it is assumed that the filter coefficients of the previous frame filter information 810 are (b1', b2', b3', b4', b5', b6') for the horizontal direction and (h1', h2', h3', h4', h5', h6') for the vertical direction. It is also assumed that the difference values of the filter coefficients, decoded by the filter information decoding unit 802, are (b1-b1', b2-b2', b3-b3', b4-b4', b5-b5', b6-b6') for the horizontal direction and (h1-h1', h2-h2', h3-h3', h4-h4', h5-h5', h6-h6') for the vertical direction. In this case, the filter coefficients of the restored filter become (b1, b2, b3, b4, b5, b65) for the horizontal direction, and (h1, h2, h3, h4, h5, h6) for the vertical direction.

If the currently decoding filter information 811 is of the reference frame decoded in the previous frame, the filter information decoding unit 802 adds the corresponding filter coefficient of the reference filter to each decoded value of the filter coefficients, to restore the filter.

If the filter identifier is "2", the filter information decoding unit 802 restores (1, −5, 20, 20, −5, 1)/32, which are filter coefficients of the reference filter, for both the horizontal and vertical directions.

Processing when the filter identifier is "3" is as follows. If the currently decoding filter information 811 is not of the reference frame decoded in the previous frame, the filter information decoding unit 802 restores the filter coefficients of the previous frame filter information 810 of this reference frame. If the currently decoding filter information 811 is of the reference frame decoded in the previous frame, on the other hand, the filter information decoding unit 802 further decodes the filter type, and restores the filter coefficients corresponding with the file type restored from the previous frame filter information 810 of this reference frame (filter 4 if the filter type is "1", filter 3 if the filter type is "2", and filter 2 if the filter type is "3").

The filter information decoding unit 802 outputs the filter information 811 which is the restored identifier and filter coefficients to the fractional accuracy reference image creation unit 804. The filter information decoding unit 802 updates the previous frame filter information 810 in the filter information storage unit 803 to the restored filter coefficients. Also the filter information decoding unit 802 sets the previous frame filter information of the frame to be the reference frame in the decoding of the next frame, corresponding with the reference frame, as the previous frame filter information 810 of the decoding target frame image of the filter information storage unit 803.

The fractional accuracy reference image creation unit 804 creates the fractional accuracy reference image 813 for each reference frame, using the filter information 811 for each reference frame which was input from the filter information decoding unit 802, and the reference image 812 which was input from the frame memory 805. Then the fractional accuracy reference image creation unit 804 outputs the created fractional accuracy reference image 813 to the frame image decoding unit 806.

Specifically, if the filter identifier included in the filter information 811 is "1" for a reference frame which was not encoded in the previous frame, the fractional accuracy reference image creation unit 804 creates a fractional accuracy reference image 813 with ¼ pixel accuracy, using the filter coefficients included in the filter information 811. If the identifier of the filter included in the filter information 811 is "2", the fractional accuracy reference image creation unit 804 creates the fractional accuracy reference image 813 with ¼ pixel accuracy, using the standard filter for both the horizontal and vertical directions. If the filter identifier included in the filter information 811 is "3", the fractional accuracy reference image creation unit 804 creates the fractional accuracy reference image 813 with ¼ pixel accuracy, using the filter coefficients included in the filter information 811.

Now the video decoding operation method according to the second embodiment will be described. Differences of the video decoding method of the second embodiment from the video decoding method of the first embodiment are the filter information decoding step S802, filter information storage step S803, and fractional accuracy reference image creation step S804, so only these steps will be described.

Figure 16:
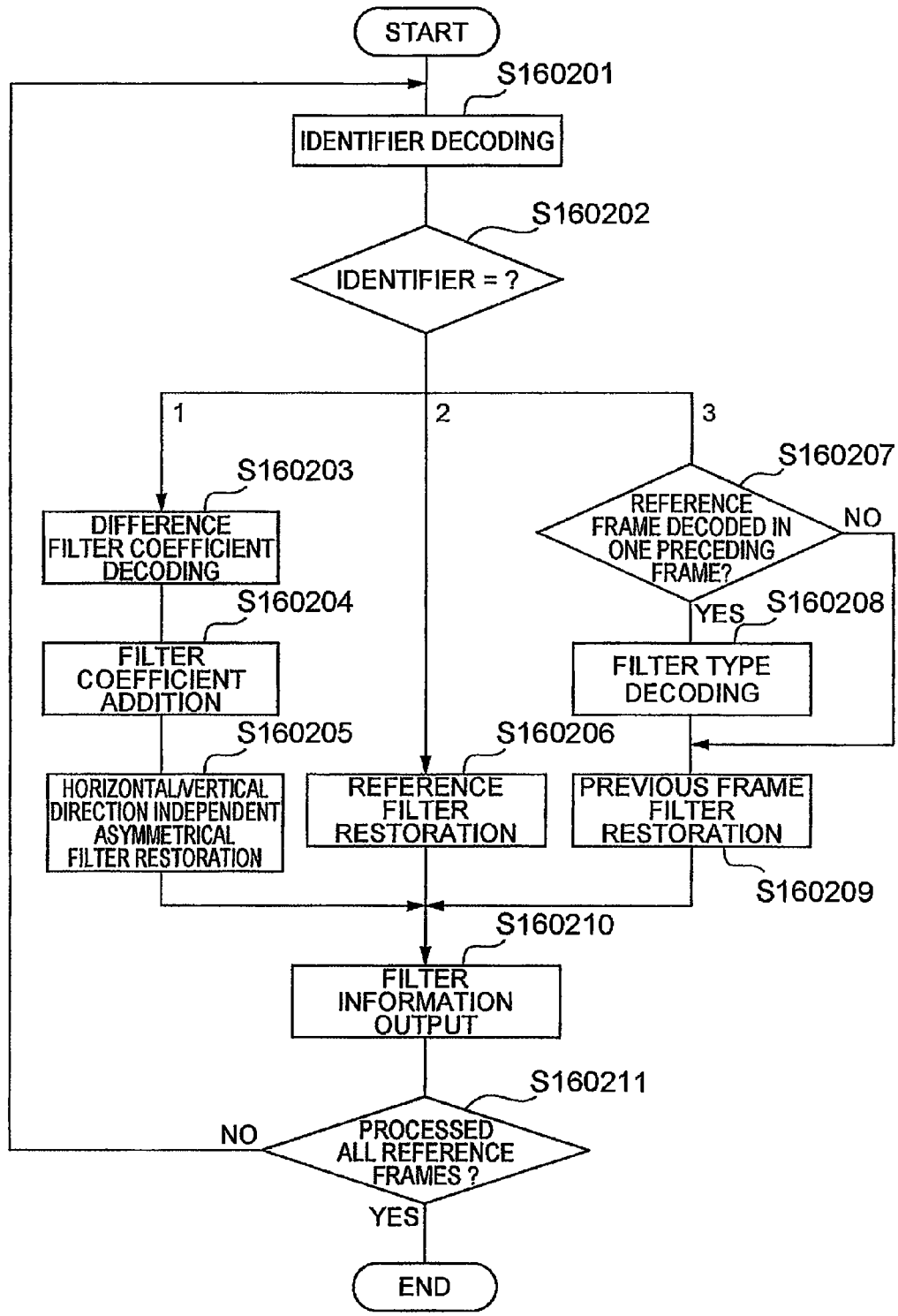
FIG. 16 is a flow chart depicting a filter information decoding step according to the second embodiment.

The filter information decoding step S1602, which is a variant form of the filter information decoding step S802, will be described with reference to FIG. 16. FIG. 16 is a flow chart depicting the filter information decoding step S1602, which is an operation of the filter information decoding operation 802 according to the second embodiment.

First the filter information decoding unit 802 decodes and restores a filter identifier for the oldest reference frame in the decoding sequence, from the filter information encoded bit stream 809 (identifier decoding step S160201).

If the filter identifier is "1" (step S160202; 1), the filter information decoding unit 802 decodes the difference value of each filter coefficient (difference filter coefficient decoding step S160203). Then the filter information decoding unit 802 adds the corresponding filter coefficient to each decoded value (filter coefficient addition step S160204), and restores an asymmetric filter which is independent in the horizontal and vertical directions (horizontal/vertical direction-independent asymmetric filter restoration step S160205).

If the currently decoding filter information 811 is not of the reference frame decoded in the previous frame, the filter information decoding unit 802 refers to the previous frame filter information 810 of the filter information storage unit 803, and adds the corresponding filter coefficient of the previous frame filter information 810 to each decoded difference value of the filter coefficients to restore the filter. If the currently decoding filter information 811 is of the reference frame decoded in the previous frame, the filter information decoding unit 802 adds the corresponding filter coefficient of the standard filter to each decoded difference value to restore the filter.

If the filter identifier is "2" (step S160202; 2), the filter information decoding unit 802 restores the filter coefficients of the standard filter (reference filter restoration step S160206).

If the filter identifier is "3" (step S160202; 3), processing is performed as follows. If the reference frame of which filter information is currently being decoded is the reference frame decoded in the previous frame (step S160307: YES), the filter information decoding unit 802 decodes the identifier of the file type (filter type decoding step S140308). Then the filter information decoding unit 802 restores the filter coefficients corresponding with the filter type restored from the previous frame filter information 810 of this reference frame. If the reference frame of which filter information is currently being decoded is not the reference frame decoded in the previous frame (step S140307: NO), the filter information decoding unit 802 restores the filter coefficients of the previous frame filter information 810 of this reference frame, without executing the processing in the filter type decoding step (previous frame filter restoration step S160209).

Then the filter information decoding unit 802 outputs the restored identifier and filter coefficients, which are the filter information 811 (filter information output step S160210).

Then the filter information decoding unit 802 judges whether the processing for all the reference frames is completed. If the processing for all the reference frames is not completed (step S160211: NO), the processings in step S160201 to S160210 are repeatedly executed for a second oldest reference frame in the decoding sequence. If processing for all the reference frames is completed (step S160211: YES), processing ends.

A difference of the filter information storage step S1603, which is an operation of the filter information storage unit 803 according to the second embodiment from the filter information storage step S803, is that the previous frame filter information 212 is stored for each reference frame to be used as the reference image.

A difference of the fractional accuracy reference image creation step S1604, which is an operation of the fractional accuracy reference image creation unit 804 according to the second embodiment from the fractional accuracy reference image creation step S804, is that the fractional accuracy reference image 813 is created using a different filter information 811 for each reference frame to be used as the reference image.

As described above, according to the video encoding device, video encoding method and video encoding program of the second embodiment, when a reference image has a plurality of frames, the reference image with a fractional pixel accuracy is generated and motion is compensated using a different filter for each reference image for encoding, therefore motion can be compensated at high accuracy, even if the frame to be encoded has motion quantity and frequency characteristics with different pixel accuracy with respect to each reference image. Also a filter is selected and decided out of a plurality of filter candidates including at least the filter used for encoding of the frame image in the previous frame. Therefore it is sufficient to encode the information to indicate the filter used for encoding of the frame image in the previous frame, and unnecessary to encode the filter coefficients. As a result, code quantity of the filter coefficients can be decreased.

Also according to the video decoding device, video decoding method and video decoding program, when a reference image has a plurality of frames, the reference image with a fractional pixel accuracy is generated and motion is compensated using a different filter for each reference image for decoding, thereby motion can be compensated at high accuracy, even if the frame to be decoded has a motion quantity and frequency characteristics with different pixel accuracy with respect to each reference image. Also a filter is selected and decided out of a plurality of filter candidates including at least the filter used for decoding of the frame image in the previous frame. Therefore it is sufficient to decode the identifier to indicate the filter used for decoding of the frame image in the previous frame, and unnecessary to decode the filter coefficients. As a result, code quantity of the filter coefficients to be decoded can be decreased.

In the above embodiments, the filter used for encoding of the frame image in the previous frame, the asymmetric filter which is independent in the horizontal and vertical directions, and the standard filter, were used for the filter candidates, but the filter candidates to be used are not limited to these filters. For example, a filter used for encoding of a frame image in two or more frames in the past may be included in the filter candidates, so that when these filters are encoded, the identifier "3", to indicate a filter used for encoding of the frame image in the past, and the identifier to identify the frame image in the past for which this filter was used, are encoded.

For an identifier to identify a frame image in the past, a number of the frame image from the beginning of the video image, or a difference value between a number of an encoding target frame image and the number of the frame image in the past, can be used. An identifier to identify the frame image in the past is not limited to these methods. In this case, various filters used for encoding of the frame images in the past can be used merely by encoding the filter identifier and the identifier to identify the frame image in the past, and motion can be compensated at high accuracy. Also in this case, code quantity of the filter coefficients can be decreased since encoding of the filter coefficients is unnecessary. An identifier to indicate the filter used for encoding, and an identifier to identify a frame image in the past for this filter was used, may be combined into one identifier for performing encoding.

If an identifier "1" to indicate an asymmetric filter which is independent in the horizontal and vertical directions, an identifier to indicate a frame of a filter used for encoding a frame image in the past, and a difference value of filter coefficients of an encoding target filter from the filter coefficients of the filter used for encoding of the frame image in the past, are encoded when the asymmetric filter which is independent in the horizontal and vertical directions is encoded, a filter used for encoding of the frame image in the past with the least difference value can be selected, and code quantity of the filter coefficients can be decreased.

Also in this case, it is possible to always use a standard filter as a filter for a frame image to be encoded by generating a reference image with fractional pixel accuracy for the first time and compensating motion, and always include this standard filter in the filters used for encoding of the frame images in the past. Thereby the standard filter can be selected without using the identifier "2" to indicate the standard filter, and the code quantity of the filter identifier can be decreased.

In the above embodiments, the filter used for decoding of the frame image in the previous frame, the asymmetric filter which is independent in the horizontal and vertical directions, and the standard filter, were used for the filter candidates, but the filter candidates to be used are not limited to these filters. For example, a filter used for decoding of a frame image in two or more frames in the past may be included in the filter candidates, so that when these filters are decoded, the identifier "3" to indicate a filter used for decoding of a frame image and the past, and the identifier to identify the frame image in the past for which this filter was used, are decoded.

For an identifier to identify a frame image in the past, a number of the frame image from the beginning of the video image, or a difference value between a number of a decoding target frame image and the number of the frame image in the past, can be used. An identifier to identify the frame image in the past is not limited to these methods. In this case, various filters used for decoding of the frame images in the past can be used merely by decoding the filter identifier and the identifier to identify the frame image in the past, and motion can be compensated at high accuracy. Also in this case, code quantity of the filter coefficients to be decoded can be decreased, since decoding of the filter coefficients is unnecessary. An identifier to indicate the filter used for decoding and an identifier to identify a frame image in the past for which this filter was used, may be combined into one identifier for performing decoding.

If an identifier "1" to indicate an asymmetric filter which is independent in the horizontal and vertical directions, an identifier to indicate a frame of a filter used for decoding of a frame image in the past, and difference values of filter coefficients of a decoding target filter from the filter coefficients of the filter used for decoding of the frame image in the past, are decoded when the symmetric filter which is independent in the horizontal and vertical directions is decoded, a filter used for decoding of the frame image in the past with the least difference value can be selected, and code quantity of the filter coefficients to be decoded can be decreased.

Also in this case, it is possible to always use a standard filter for a frame image to be decoded by generating a reference image with fractional pixel accuracy for the first time and compensating motion, and always include this standard filter in the filters used for decoding of the frame images in the past. Thereby the standard filter can be selected without using the identifier "2" to indicate the standard filter, and code quantity of the filter identifiers to be decoded can be decreased.

In the above embodiments, a 6-tap filter to create a reference image with ½ pixel accuracy was used for the filter, but the filter to be used is not limited to this. For example, a filter to create a reference image with an arbitrary fractional pixel accuracy may be used, or a filter with an arbitrary number of taps may be used. A method for creating a reference image with fractional pixel accuracy to be used for motion compensation is not limited to the above methods. The fractional pixel accuracy of the reference image is not limited to ¼ pixel accuracy, but may be an arbitrary fractional pixel accuracy. In the above embodiments, the first filter, second filter and third filter were provided as filters to be used, but all of these filters need not be provided, and any one of filters may be omitted. Also a filter other than the first filter, second filter and third filter may be added to the candidates as a filter to be used.

When the filter coefficients of the filter 1 are encoded, the value of each filter coefficient itself may be encoded, instead of encoding a difference value of each filter coefficient from the corresponding filter coefficient of the previous frame filter information, or a difference value of each filter coefficient of the reference filter may be encoded.

When the filter coefficients of the filter 1 are decoded, the value of each filter coefficient itself may be decoded, instead of decoding a difference value of each filter coefficient from the corresponding filter coefficient of the previous frame filter information, or a difference value from each filter coefficient of the reference filter may be decoded.

In the above embodiments, the filter decision unit 202 decides the filter information, the fractional accuracy reference image creation unit 204 creates the fractional accuracy reference image, and the frame image encoding/decoding unit 207 compensates motion, and encodes and decodes the encoding target frame, but the encoding and decoding methods are not limited to this. For example, if the fractional accuracy reference image creation and the frame image encoding/decoding are executed when the filter decision unit 202 calculates the encoding efficiency to decide the filter information, the fractional accuracy reference image creation unit 204 and the frame image encoding/decoding unit 207 may be omitted.

In the above embodiments, the output unit 208 inserts the filter information encoded bit stream 214 before the frame image encoded bit stream 216 for each encoding target frame, so as to combine the two bit streams, and outputs [the combined bit streams] to the outside, but may combine the filter information encoded bit stream 214 into the frame image encoded bit stream 216, and outputs it to the outside as the encoded bit stream 218. The input unit 801 may receive the frame image encoded bit stream 216 and the filter information encoded bit stream 214 included in the encoded bit stream 807, and separate these two streams.

In the second embodiment in which a reference image with fractional accuracy is created using a different filter for each reference frame, the third filter of the reference frame encoded in the previous frame need not include all the filters used for encoding of the frame image in the previous frame. The third filter of the reference frame decoded in the previous frame need not include all the filters used for decoding of the frame image in the previous frame.

In the second embodiment, the filter coefficients of the first filter of the reference frame encoded in the previous frame need not be encoded as the difference values from the filter coefficients of the standard filter. For example, the filter coefficients of the first filter of the reference frame encoded in the previous frame may be encoded as the difference values from the filter coefficients of any filter, out of the filters used for encoding of the frame image in the previous frame, or may be encoded as the difference values from other filter coefficients, or as the values of the filter coefficients themselves.

In the second embodiment, the filter coefficients of the first filter of the reference frame decoded in the previous frame need not be decoded as the difference values from the filter coefficients of the standard filter. For example, the filter coefficients of the first filter of the reference frame decoded in the previous frame may be decoded as the difference values from the filter coefficients of any filter, out of the filters used for decoding of the frame image in the previous frame, or may be decoded as the difference values from other filter coefficients, or as the values of the filter coefficients themselves.

In the second embodiment, the sequence of deciding the filter, the sequence of encoding the filter information, and the sequence of decoding the filter information, are not limited to the one from the older information in the encoding or decoding sequence, but may be a different sequence.

What is claimed is:

1. A video encoding device which creates a reference frame image with a fractional pixel accuracy and compensates a motion for a video image formed of a time series of frame images, by using a filter for each frame image, comprising:
a filter information storage unit that stores, in relation to a past frame image, a past filter which has been used for encoding of the past frame image;
a filter decision unit responsive to receipt of a set of multiple candidate filters to select, from the set, a single filter which yields a minimum code quantity among the multiple candidate filters and is to be used for encoding of a current frame image, the set of multiple candidate filters including an adaptively generated filter and the past filter stored in the filter information storage unit in relation to the past frame image, wherein a code quantity for the adaptively generated filter is a sum of a code quantity of the current frame image encoded with the adaptively generated filter and a code quantity of adaptively generated filter itself, and a code quantify for the past filter consists only of a code quantity of the current frame image encoded with the past filter; and
a filter information encoding unit that encodes a filter type identifier indicating a type of the single filter selected by the filter decision unit.

2. The video encoding device according to claim 1, wherein, when the single filter selected by the filter decision unit is the past filter, the filter information encoding unit encodes the filter type identifier indicating that the selected single filter is a past filter and an identifier identifying the past frame image which the selected past filter has been used to encode.

3. The video encoding device according to claim 1, wherein, when a plurality of reference frame images are used to encode the current frame image, and past filters which have been used for encoding of the reference frame images are stored for the respective reference frame images, the filter decision unit selects the single filter for each of the reference frame images from among a set of candidate filters which includes at least the past filter used to encode a corresponding one of the reference frame images.

4. The video encoding device according to claim 3, wherein, if the single filter selected by the filter decision unit for one of the reference frame images is a past filter used for encoding of the one of the reference frame images, the filter information encoding unit encodes, for the one of the reference frame images, the filter type identifier indicating that the selected single filter is a past filter and an identifier identifying the one of the reference frame images.

5. A video encoding device which creates a reference frame image with a fractional pixel accuracy and compensates motion for a video image of a time series of frame images, by using a filter for each frame image, comprising:
a filter information storage unit that stores, in relation to a frame image immediately preceding a current frame image, a past filter which has been used for encoding of immediately preceding frame image;
a filter decision unit responsive to receipt of a set of multiple candidate filters to select, from the set, a single filter which yields a minimum code quantity among the multiple candidate filters and is to be used for encoding of the current frame image, the set of multiple candidate filters including an adaptively generated filter and the past filter stored by the filter information storage unit in relation to the immediately preceding frame image, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter; and a filter information encoding unit that encodes a filter type identifier indicating a type of the single filter selected by the filter decision unit.

6. The video encoding device according to claim 5, wherein, when the single filter selected by the filter decision unit is the past filter used for encoding of the immediately preceding frame image, the filter information encoding unit only encodes the filter type identifier indicating that the selected single filter is a past filter.

7. The video encoding device according to claim 5, wherein, when a plurality of reference frame images are used to encode the current frame image, and past filters which have been used for encoding the reference frame images are stored for the respective reference frame images, the filter decision unit selects the single filter for each of the reference frame images from among a set of candidate filters which includes at least the past filter used to encode a corresponding one of the reference frame images.

8. The video encoding device according to claim 7, wherein, if the single filter selected by the filter decision unit for one of the reference frame images is a past filter used for encoding of the one of the reference frame images, the filter information encoding unit encodes, for the one of the reference frame images, the filter type identifier indicating that the selected single filter is a past filter and an identifier identifying the one of the reference frame images.

9. The video encoding device according to claim 1, wherein the adaptively generated filter is an asymmetric filter, which is applied independently in horizontal and vertical directions.

10. The video encoding device according to claim 9, wherein the filter information encoding unit encodes the filter type identifier indicating that the selected single filter is an asymmetric filter and filter coefficients of the asymmetric filter.

11. The video encoding device according to claim 1, wherein the set of multiple candidate filters includes a predetermined criterion filter.

12. The video encoding device according to claim 11, wherein the filter information encoding unit encodes the filter type identifier indicating that the selected single filter is a predetermined criterion filter.

13. A video decoding device which creates a reference frame image with a fractional pixel accuracy and compensates motion by using a filter for each frame image, and decodes a video image of a time series of frame images, comprising:

a filter information storage unit that stores, in relation to a past frame image, a past filter which has been used for decoding of the past frame image; and a filter information decoding unit that determines a single filter which yields a minimum code quantity among a set of multiple candidate filters and was selected from the set to encode a current frame image, the set of multiple candidate filters including an adaptively generated filter and the past filter stored by the filter information storage unit in relation to the past frame image, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter.

14. The video decoding device according to claim 13, wherein, if the single filter is the past filter, the filter information decoding unit decodes a filter type identifier indicating that the determined single filter is a past filter and an identifier identifying the past frame image which the determined past filter has been used to decode.

15. The video decoding device according to claim 13, wherein, when a plurality of reference frame images are used to decode the current frame image, the filter information storage unit stores past filters which have been used for decoding of the reference frame images.

16. The video image decoding device according to claim 15, wherein the filter information decoding unit decodes, for the respective reference frame images, a filter type identifier indicating that the determined single filter is a past filter and an identifier identifying a corresponding one of the reference frame images which the determined past filter has been used to decode.

17. A video decoding device which creates a reference frame image with a fractional pixel accuracy and compensates motion by using a filter for each frame image, and decodes a video image of a time series of frame images, comprising:

a filter information storage unit that stores, in relation to a frame image immediately preceding a current frame image, a past filter which has been used for decoding of the immediately preceding frame image; and a filter information decoding unit that determines a single filter which yields a minimum code quantity among a set of multiple candidate filters and was selected from the set to encode the current frame image, the set of multiple candidate filters including an adaptively generated filter and the past filter stored by the filter information storage unit in relation to the immediately preceding frame image, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter.

18. The video decoding device according to claim 17, wherein the filter information decoding unit decodes a filter type identifier indicating that the determined single filter is a past filter which has been used for decoding of the immediately preceding frame image.

19. The video decoding device according to claim 17, wherein, when a plurality of reference frame images are used to decode the current frame image, the filter information storage unit stores past filters which have been used for decoding of the reference frame images.

20. The video decoding device according to claim 19, wherein the filter information decoding unit decodes, for the respective reference frame images, a filter type identifier indicating that the stored filter is a past filter used for decoding of the immediately preceding frame image.

21. The video decoding device according to claim 13, wherein the adaptively generated filter is an asymmetric filter which is applied independently in horizontal and vertical directions.

22. The video decoding device according to claim 21, wherein the filter information decoding unit decodes a filter type identifier indicating that the determined single filter is an asymmetric filter and filter coefficients of the asymmetric filter.

23. The video decoding device according to claim 13, wherein the set of candidate filters includes a predetermined criterion filter.

24. The video decoding device according to claim 23, wherein the filter information decoding unit decodes a filter type identifier indicating that the determined single filter is a predetermined criterion filter.

25. A video encoding method for a video encoding device creating a reference frame image with a fractional pixel accuracy and compensating motion, for a video image of a time series of frame images, by using a filter for each frame image, the method comprising:
 a filter information storage step in which device filter information storage unit stores, in relation to a past frame image, a past filter which has been used for encoding of the past frame image;
 a filter decision step in which a filter decision unit is responsive to reception of a set of multiple candidate filters to select, from the set, a single filter which yields a minimum code quantity among the multiple candidate filters and is to be used for encoding of a current frame image, the set of multiple candidate filters including an adaptively generated filter and the past filter stored in relation to the past frame image in the filter information storage step, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter; and
 a filter information encoding step in which a filter information encoding unit encodes a filter type identifier indicating a type of the single filter selected in the filter decision step.

26. The video encoding method according to claim 25, wherein, when the single filter selected in the filter decision step is the past filter the filter information encoding step further comprises encoding the filter type identifier indicating that the selected filter is a past filter and an identifier identifying the past frame image which the selected past filter has been used to encode.

27. The video encoding method according to claim 25, wherein, when a plurality of reference frame images are used to encode the current frame image, and past filters which have been used for encoding of the reference frame images are stored for the respective reference frame images in the filter information storage step, the single filter is selected in the filter decision step for each of the reference frame images from among a set of candidate filters which includes the past filter used to encode a corresponding one of the reference frame images.

28. The video encoding method according to claim 27, wherein, if the single filter selected in the filter decision step for one of the reference frame images is a past filter used for encoding the one of the reference frame images, the information encoding step comprises encoding, for the one of the reference frame images, the filter type identifier indicating that the selected single filter is a past filter and an identifier identifying the one of the reference frame images.

29. A video encoding method for a video encoding device creating a reference frame image with a fractional pixel accuracy and compensating motion, for a video image of a time series of frame images, by using a filter for each frame image, the method comprising:
 a filter information storage step in which a filter information storage unit stores, in relation to a frame image immediately preceding a current frame image, a past filter which has been used for encoding the immediately preceding frame image;
 a filter decision step in which a filter decision unit is responsive to receipt of a set of multiple candidate filters to select, from the set, a single filter which yields a minimum code quantity among the multiple candidate filters and is to be used for encoding of the current frame image, the set of multiple candidate filters including an adaptively generated filter and the past filter stored in relation to the immediately preceding frame image in the filter information storage step, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter; and
 a filter information encoding step in which the video encoding device encodes a filter type identifier indicating a type of the single filter selected in the filter decision step.

30. The video encoding method according to claim 29, wherein, when the single filter selected in the filter decision step is the past filter used for encoding of the immediately preceding frame image, the filter information encoding step further comprises only encoding the filter type identifier indicating that the selected single filter is a past filter.

31. The video encoding method according to claim 29, wherein, when a plurality of reference frame images are used to encode the current frame image, and past filters which have been used for encoding of the reference frame images are stored in the filter information storage step for the respective reference frame images, the filter decision step comprises selecting the single filter for each of the reference frame images from among a set of candidate filters which includes the past filter used to encode a corresponding one of the reference frame images.

32. The video encoding method according to claim 31, wherein, if the single filter selected in the filter decision step for one of the reference frame images is a past filter used for encoding of the one of the reference frame images, the filter information encoding step further comprises encoding, for the one of the reference frame images, the filter type identifier indicating that the selected single filter is a past filter and an identifier identifying the one of the reference frame images.

33. The video encoding method according to claim 25, wherein in the filter decision step, the adaptively generated filter is an asymmetric filter which is applied independently in horizontal and vertical directions.

34. The video encoding method according to claim 33, wherein the filter type identifier indicating that the selected single filter is an asymmetric filter and filter coefficients of the asymmetric filter are encoded in the filter information encoding step.

35. The video encoding method according to claim 25, wherein in the filter decision step, the set of multiple candidate filters includes a predetermined criterion filter.

36. The video encoding method according to claim 35, wherein the filter type identifier indicating that the selected single filter is a criterion filter is encoded in the filter information encoding step.

37. A video decoding method for a video decoding device creating a reference frame image with a fractional pixel accuracy and compensating motion using a filter for each frame image, and decoding a video image of a time series of frame images, the method comprising:

a filter information storage step in which a filter information storage unit stores, in relation to a past frame image, a past filter which has been used for decoding of the past frame image; and a filter information decoding step in which a filter information decoding unit determines a single filter which yields a minimum code quantity among a set of multiple candidate filters and was selected from the set to encode a current frame image, the set of candidate filters including an adaptively generated filter and the past filter stored in relation to the past frame image in the filter information storage step, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter.

38. The video decoding method according to claim 37, wherein if the single filter is the past filter, a filter type identifier indicating that the determined single filter is a past filter and an identifier identifying the past frame image, which the determined past filter has been used to decode, are decoded in the filter information decoding step.

39. The video decoding method according to claim 37, wherein, when a plurality of reference frame images are used to decode the current frame image, past filters which have been used for decoding of the reference frame images are stored in the filter information storage step for the respective reference frame images.

40. The video decoding method according to claim 39, wherein a filter type identifier indicating that the determined single filter is a past filter and an identifier identifying a corresponding one of the reference frame images which the determined past filter has been used to decode, are decoded in the filter information decoding step.

41. A video decoding method for a video decoding device creating a reference frame image with a fractional pixel accuracy and compensating motion using a filter for each frame image, and decoding a video image of a time series of frame images, the method comprising:

a filter information storage step in which a filter information storage unit stores, in relation to a frame image immediately preceding a current frame image, a past filter which has been used for decoding of the immediately preceding frame image; and a filter information decoding step in which a filter information decoding unit determines a single filter which yields a minimum code quantity among a set of multiple candidate filters and was selected from the set to encode the current frame image, the set of candidate filters including an adaptively generated filter and the past filter stored in relation to the immediately preceding frame image in the filter information storage step, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter.

42. The video decoding method according to claim 41, wherein a filter type identifier indicating that the determined single filter is a past filter which has been used for decoding of the immediately preceding frame image is decoded in the filter information decoding step.

43. The video decoding method according to claim 41, wherein, when a plurality of reference frame images are used to decode the current frame image, past filter which have been used for decoding of the reference frame images are stored for the respective reference frame images in the filter information storage step.

44. The video decoding method according to claim 43, wherein a filter type identifier indicating that the stored filter is a past filter which has been used for decoding of the immediately preceding frame image is decoded for the respective reference frame images in the filter information decoding step.

45. The video decoding method according to claim 37, wherein in the filter information decoding step, the adaptively generated filter is an asymmetric filter which is applied independently in horizontal and vertical directions.

46. The video decoding method according to claim 45, wherein a filter type identifier indicating that the determined single filter is an asymmetric filter and filter coefficients of the asymmetric filter are decoded in the filter information decoding step.

47. The video decoding method according to claim 37, wherein in the filter information decoding step, the set of candidate filters includes a predetermined criterion filter.

48. The video decoding method according to claim 47, wherein a filter type identifier indicating that the determined single filter is a predetermined criterion filter is decoded in the filter information decoding step.

49. A non-transitory storage medium which stores a video encoding program for causing a computer to function such that a reference frame image with a fractional pixel accuracy is created and motion is compensated for a video image of a time series of frame images, by using a filter for each frame image, the computer being caused the video encoding program to function as:

a filter information storage unit that stores, in relation to a past frame image, a past filter which has been used for encoding of the past frame image;

a filter decision unit responsive to receipt of a set of multiple candidate filters to select, from the set a single filter which yields a minimum code quantity among the multiple candidate filters and is to be used for encoding of a current frame image, the set of candidate filters including an adaptively generated filter and the past filter stored in relation to the past frame image in the filter information storage unit, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter; and a filter information encoding unit that encodes a filter type identifier indicating a type of the single filter selected by the filter decision unit.

50. A non-transitory storage medium which stores a video decoding program for causing a computer to function such that a reference frame image with a fractional pixel accuracy is created and motion is compensated, and a video image of a time series of frame images is decoded, by using a filter for each frame image, the computer being caused by the video decoding program to function as:

a filter information storage unit that stores, in relation to a past frame image, a past filter which has been used for decoding of the past frame image; and a filter information decoding unit that determines a single filter which yields a minimum code quantity among a set of multiple candidate filters and was used to encode a current frame image, the set of candidate filters including an adaptively generated filter and the past filter stored in the filter information storage unit in relation to the past frame image, wherein a code quantity for the adaptively generated filter is a sum of a code quantity of the current frame image encoded by the adaptively generated filter and a code quantity of the adaptively generated filter itself, and a code quantity for the past filter consists only of a code quantity of the current frame image encoded by the past filter.

* * * * *